US011268973B2

(12) United States Patent
Duncan et al.

(10) Patent No.: US 11,268,973 B2
(45) Date of Patent: Mar. 8, 2022

(54) SPACE-TO-TIME CONVERSION TECHNIQUE USING REMOTELY SENSED VELOCITY FIELDS

(71) Applicant: Texas Tech University System, Lubbock, TX (US)

(72) Inventors: James Duncan, West Palm Beach, FL (US); Brian Hirth, Lubbock, TX (US); John Schroeder, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 466 days.

(21) Appl. No.: 16/355,471

(22) Filed: Mar. 15, 2019

(65) Prior Publication Data

US 2019/0285662 A1 Sep. 19, 2019

Related U.S. Application Data

(60) Provisional application No. 62/643,792, filed on Mar. 16, 2018.

(51) Int. Cl.
*G01P 5/00* (2006.01)
*G01P 5/26* (2006.01)
*G01S 17/95* (2006.01)
*G01S 13/95* (2006.01)

(52) U.S. Cl.
CPC ............... *G01P 5/001* (2013.01); *G01P 5/26* (2013.01); *G01S 13/95* (2013.01); *G01S 17/95* (2013.01)

(58) Field of Classification Search
CPC .......... G01P 5/001; G01P 5/26; G01P 13/045; G01S 17/95; G01S 13/95; G01S 17/58; G01S 17/87; G01S 13/87; Y02A 90/10
See application file for complete search history.

(56) References Cited

U.S. PATENT DOCUMENTS

2011/0172920 A1* 7/2011 Yee ................. G01S 7/417
702/3
2014/0316704 A1* 10/2014 Mizutani ................ G01W 1/10
702/3

FOREIGN PATENT DOCUMENTS

WO PCT/GB2016/052826 3/2017

OTHER PUBLICATIONS

E.N. Anagnostou et al, "Real-Time Radar Rainfall Estimation. Part I: Algorithm Formulation", Journal of Atmospheric and Oceanic Technology, vol. 16, 1999.*
Analysis of Advection, University Corporation of Atmospheric Research, 2015 (https://www.meted.ucar.edu/labs/synoptic/kinematics/advection/print.php).*

(Continued)

*Primary Examiner* — Alexander Satanovsky
(74) *Attorney, Agent, or Firm* — Loza & Loza LLP; Kevin L. Soules

(57) ABSTRACT

A system, method, and apparatus are disclosed for determining ABL wind field advection speed and direction comprising collecting at least two wind volumes from the ABL wind field, defining portions of the measurement domain within the at least two wind volumes for analysis, determining the advection of an isolated wind field between the at least two wind volumes, and iterating a process of correcting for intra-volume advection, objective analysis, and determining the inter-volume advective properties; wherein upon convergence of a measured advection profile, the advective properties of the ABL wind field have been appropriately derived.

19 Claims, 21 Drawing Sheets

(56) References Cited

OTHER PUBLICATIONS

Xiao Liu et al., "A Spatio-Temporal Modeling Approach for Weather Radar Reflectivity Data and Its Applications in Tropical Southeast Asia", IBM T.J. Watson Research Center, 2016—36 pages.*

A. Shapiro et al.,"Spatially Variable Advection Correction of Radar Data. Part I: Theoretical Considerations", Journal of the Atmospheric Sciences, vol. 67, Nov. 2010, pp. 3445-3457.*

Giacomo Valerio Iungo et al., "Volumetric Lidar Scanning of Wind Turbine Wakes under Convective and Neutral Atmospheric Stability Regimes", American Meteorological Society, 2014, pp. 2035-2048.*

Barnes, S. L., 1964: A technique for maximizing details in numerical weather map analysis. J. Appl. Meteor., 3, 396-409.

Lewis, J. P., 1995: Fast Template Matching. Vision Interface, 10, 120-123.

Higgins, C. W., M. Froidevaux, V. Simenov, N. Vercauteren, C. Barry, and M. B. Parlagne, 2012: The effect of scale on the applicability of Taylor's frozen turbulence hypothesis in the atmospheric boundary layer. Boundary-Layer Meteor., 143, 379-391.

Hirth, B. D. and J. L. Schroeder, 2013: Documenting wind speed and power deficits behind a utility-scale wind turbine. J. Appl. Meteor. Climatol., 52, 39-46.

Taylor, G., 1938: The spectrum of turbulence. Proc. Roy. Soc. Lond., 164, 476-490.

Anagnostou, EN, Krajewski WF. Real-time radar rainfall estimation. Part I: Algorithm formulation. Journal of Atmospheric and Oceanic Technology. 1999; 16: 189-197.

Handwerker, J. Cell tracking with TRACE3D—a new algorithm. Atmospheric Research. 2002; 61: 15-34.

Hirth BD, Schroder JL, Gunter WS, Guynes JG. Measuring a utility-scale wind turbine wake 2012; 29: 765-771.

Davies-Jones RP. Dual-Doppler radar coverage area as a function of measurement accuracy and spatial resolution. J. Applied Meteorology. 1979; 18: 1229-1233.

Schlipf D, Kapp S, Anger J, et al. Prospects of optimization of energy production by lidar assisted control of wind turbines. Proceedings of European Wind Energy Conference and Exhibition (EWEA), Brussels, Mar. 14-17, 2011; 1-10.

Mikkelsen T, Angelou N, Hansen K, et al. A spinner-integrated wind lidar for enhanced wind turbine control. Wind Energy. 2012; 16: 625-643.

Dunne FL, Schlipf D, Pao LY, et al. Comparison of two independent lidar-based pitch control designs. Proceedings of the 50th AIAA Aerospace Sciences Meetings and Exhibit (AIAA), Nashville, TN, Jan. 9-12, 2012: 1-19.

Allik A, Uiga J, Annuk A. Deviations between wind speed data measured with nacelle-mounted anemometers on small wind turbines and anemometers mounted on measuring masts. Agronomy Research. 2014; 12: 433-444.

Smith B, Link H, Randall G, McCoy T. Applicability of nacelle anemometer measurements for use in turbine power performance tests. American Wind Energy Association (AWEA) Windpower, Portland, OR, Jun. 2-5, 2002: 1-19.

Fleming PA, Scholbrock AK, Jehu, et al. Field-test using a nacelle-mounted lidar for improving wind turbine power capture by reducing yaw misalignment. The Science of Making Torque from Wind. 2014; 524: 1-10.

Käsler Y, Rahm S, Simmet R. Wake measurements of a multi-MW wind turbine with coherent long-range pulsed Doppler wind lidar. Journal of Atmospheric and Oceanic Technology. 2010; 27: 1529-1532.

Smalikho IN, Banakh VA, Pichugina YL, et al. Lidar investigation of atmosphere effect on a wind turbine wake. Journal of Atmospheric and Oceanic Technology. 2013; 30: 2554-2570.

Hirth, B. D., J. L. Schroeder, W. S. Gunter, and J. G. Guynes, 2015: Coupling Doppler radar-derived wind maps with operational turbine data to document wind farm complex flows. Wind Energ., 18, 529-540.

Hirth, B. D., J. L. Schroeder, Z. Irons, and K. Walter, 2016: Dual-Doppler measurements of a wind ramp event at an Oklahoma wind plant. Wind Energ., 19, 953-962.

* cited by examiner

SPACE-TO-TIME CONVERSION TECHNIQUE USING REMOTELY SENSED VELOCITY FIELDS

CROSS REFERENCE TO RELATED PATENT APPLICATIONS

This patent application claims the priority and benefit under 35 U.S.C. § 119(e) of U.S. Provisional Patent Application Ser. No. 62/643,792, filed Mar. 16, 2018, entitled "SPACE-TO-TIME CONVERSION TECHNIQUE USING REMOTELY SENSED VELOCITY FIELDS." U.S. Provisional Patent Application Ser. No. 62/643,792 is herein incorporated by reference in its entirety.

STATEMENT OF GOVERNMENT RIGHTS

The invention described in this patent application was made with Government support under the "Building the Foundation for Smart Wind Farms through First-Order Controls Opportunities Based on Real-Time Observations of Complex Flows" Project (Grant R15 AT008733), Contract Number CBET-1336935, awarded by the National Science Foundation. The Government may have certain rights in the invention.

TECHNICAL FIELD

The present embodiments are generally related to atmospheric science. The embodiments are further related to wind technology applications, including wind energy applications. The embodiments are also related to methods and systems for extracting temporal information from spatially distributed measurements (i.e., space-to-time conversions). More specifically, the embodiments are related to methods and systems for the enhanced estimation of atmospheric boundary layer (ABL) advective properties to improve the space-to-time conversion processes for technological applications.

BACKGROUND

Advancements in scanning remote sensing technologies have enhanced the ability to measure the ABL wind field across a region. Objective-based scanning strategies are typically used to obtain measurements, wherein the rotating components of a scanning instrument(s) focuses on different portions of the three-dimensional measurement field at specific times. The time (i.e., the revisit time) it takes the instrument to scan the entire measurement domain (i.e., obtain measurements from a three-dimensional volume of space) can vary greatly depending on the instrument, size of the experimental domain, and the chosen scanning strategy. Regardless, accurately extracting high-resolution temporal information from the spatially distributed measurements has historically been challenging, in part because turbulent structures (i.e., gusts and lulls) move during the data acquisition period.

Advection, both inter- and intra-volume, of the ABL wind field must be properly characterized to accurately resolve temporal variations in the flow at sub-volume time scales, where "sub-volume" refers to a time period less than the revisit time it took to scan the domain measurement volume. While attempts have been made to determine advection characteristics, a robust technique enabling micro-scale applications remained elusive.

Taylor's hypothesis has traditionally been assumed to determine ABL wind field advection. Taylor's hypothesis asserts that the advection of ABL turbulence can be attributed to the local mean wind speed and direction of the flow. However, the validity of Taylor's hypothesis varies and it cannot be systematically relied upon to accurately denote the advection of momentum through the ABL.

As such, improved methods and systems for providing accurate estimates of boundary layer advective properties are required to improve space-to-time conversion processes for wind energy and other wind related applications.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to enhance wind energy relevant flow field monitoring and related applications.

It is another aspect of the disclosed embodiments to provide methods and systems for providing enhanced estimation of ABL wind field advective properties.

It is another aspect of the disclosed embodiments to provide a method and system to improve space-to-time conversion processes.

Given the ability of some scanning instruments to accurately measure smaller scales of motion using reasonably short time scales (e.g., measurement volume revisit times of approximately one minute), the advective properties of the ABL wind field can be directly estimated via the disclosed spatial correlation technique. The embodiments disclosed herein provide an improved space-to-time conversion process by leveraging the enhanced advective properties. Using this space-to-time conversion process, the spatially mapped velocity fields can be used to reliably extract sub-volume time histories of wind speed and direction at various individual locations within the measurement domain.

The embodiments expand the potential uses of scanning instruments (e.g., radio detection and ranging ["radar"], light detection and ranging ["lidar"], etc.). As an example, for wind energy applications, the embodiments enable the extraction of long lead time forecasts of turbine inflow conditions and improved wind turbine wake assessments.

The embodiments of the disclosed methods and systems for determining ABL wind field advection can comprise: (1) ABL wind field information measured across two or more volumes, (2) transformation of the measured wind fields from their native polar coordinate space onto a Cartesian gridded domain (or more generally, from any native coordinate space to another coordinate space), (3) defining an advection analysis area (AAA) in each of at least two wind volumes, (4) defining the isolated wind field (IWF) and its location in the first of at least two wind volumes, and (5) determining the location of the IWF in the latter wind volume, which denotes the advection between the two wind volumes.

In certain embodiments, determining the advection of the IWF between the at least two wind volumes can include: (5a) determining a mean horizontal wind speed and direction of the flow measured across the AAA of the first wind volume, (5b) determining the time elapsed between the first and latter of the at least two wind volumes, (5c) using the first and second steps to define a domain of feasible advection solutions, (5d) performing cross-correlation between the IWF in the first wind volume and the domain of feasible advection solutions in the latter wind volume, (5e) determining the location of the IWF in the latter wind volume based upon the displacement vector exhibiting the highest correlation coefficient, and (5f) defining the advection speed and direction based upon information derived above.

Methods disclosed herein—correcting for intra-volume advection, objective analysis (e.g. Cartesian grid interpolation), and steps (5a)-(5f)—can be iterated until there is convergence in the measured advection profile.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
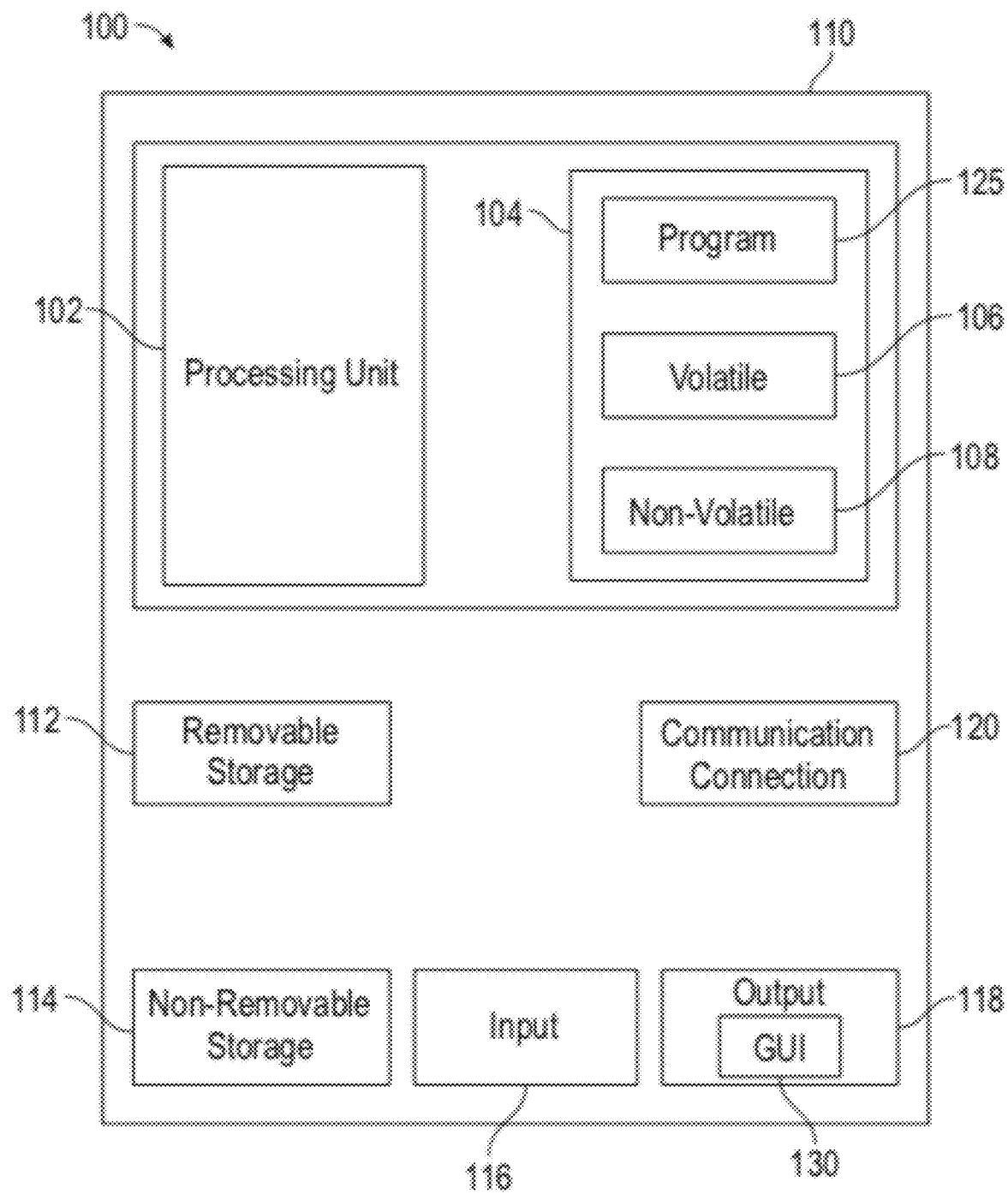
FIG. 1 depicts a block diagram of a computer system which is implemented in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification and attached documents are indicative of the level of skill of those skilled in the art to which this invention pertains. All publications and patent applications are herein incorporated by reference in their entirety, to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those skilled in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Figure 2:
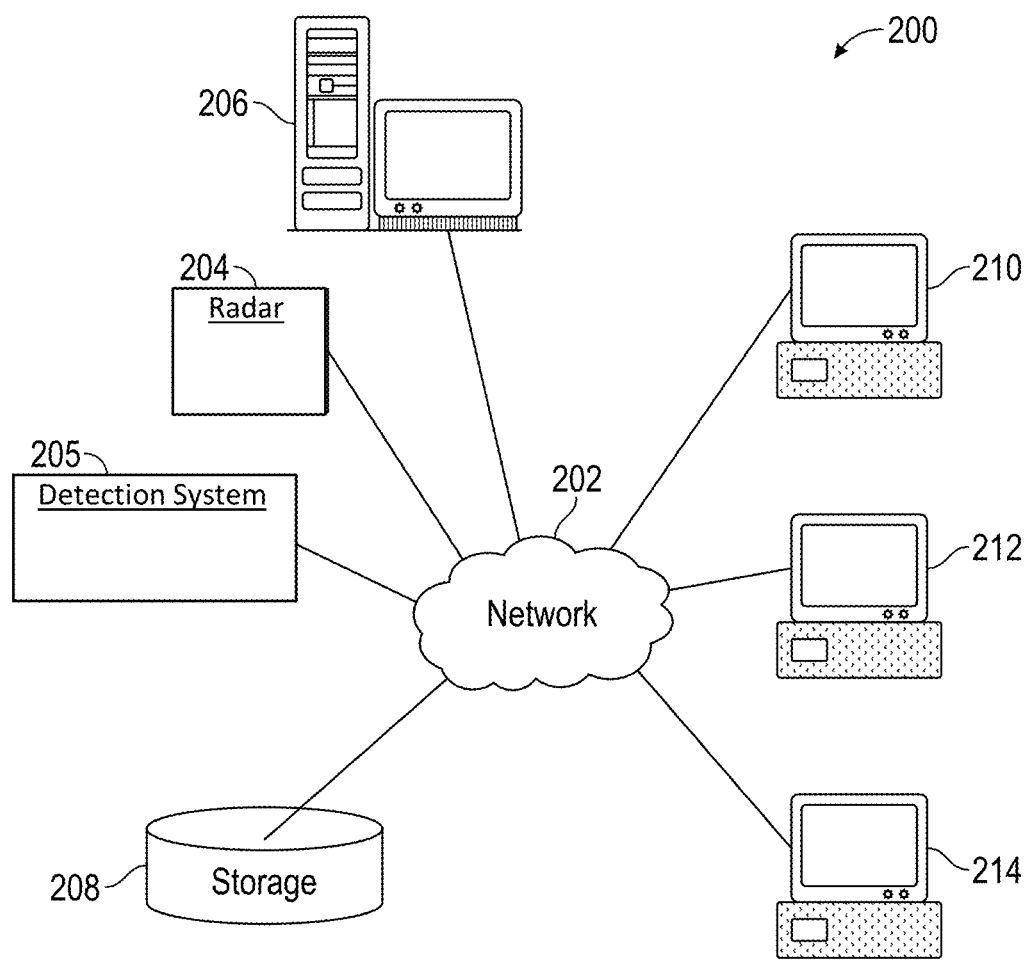
FIG. 2 depicts a graphical representation of a network of data-processing devices in which aspects of the present embodiments may be implemented.
Figure 3:
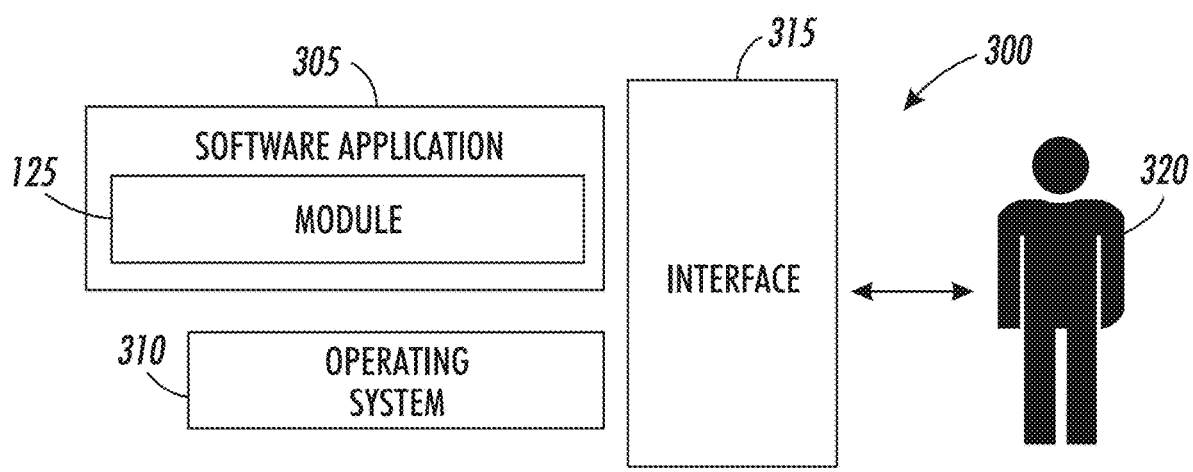
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as a printer, copier, scanner, fax machine, multi-function device, multi-function printer, radar device 204, detection system 205 or the like, and a memory storage unit such as, for example, memory or database 208.

In the depicted example, radar device 204, detection system 205, and/or server 206 connect to network 202 along with storage unit 208. In addition, clients 210, 212, and 214 connect to network 202. These clients 210, 212, and 214 may be, for example, personal computers, network computers, or other such computing devices including mobile devices, tablet computers, etc. Computer system 100 depicted in FIG. 1 can be, for example, a client such as client 210, 212, and/or 214. Alternatively, clients 210, 212, and 214 may also be, for example, a photographic camera, video camera, tracking device, sensor, etc.

Computer system 100 can also be implemented as a server such as server 206, depending upon design considerations. In the depicted example, server 206 provides data such as boot files, operating system images, applications, and application updates to clients 210, 212, and 214, radar device 204, and/or detection system 205. Clients 210, 212, and 214 and radar device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

The embodiments disclosed herein disclose methods and systems through which the advection of the ABL wind field can be determined.

Figure 4:
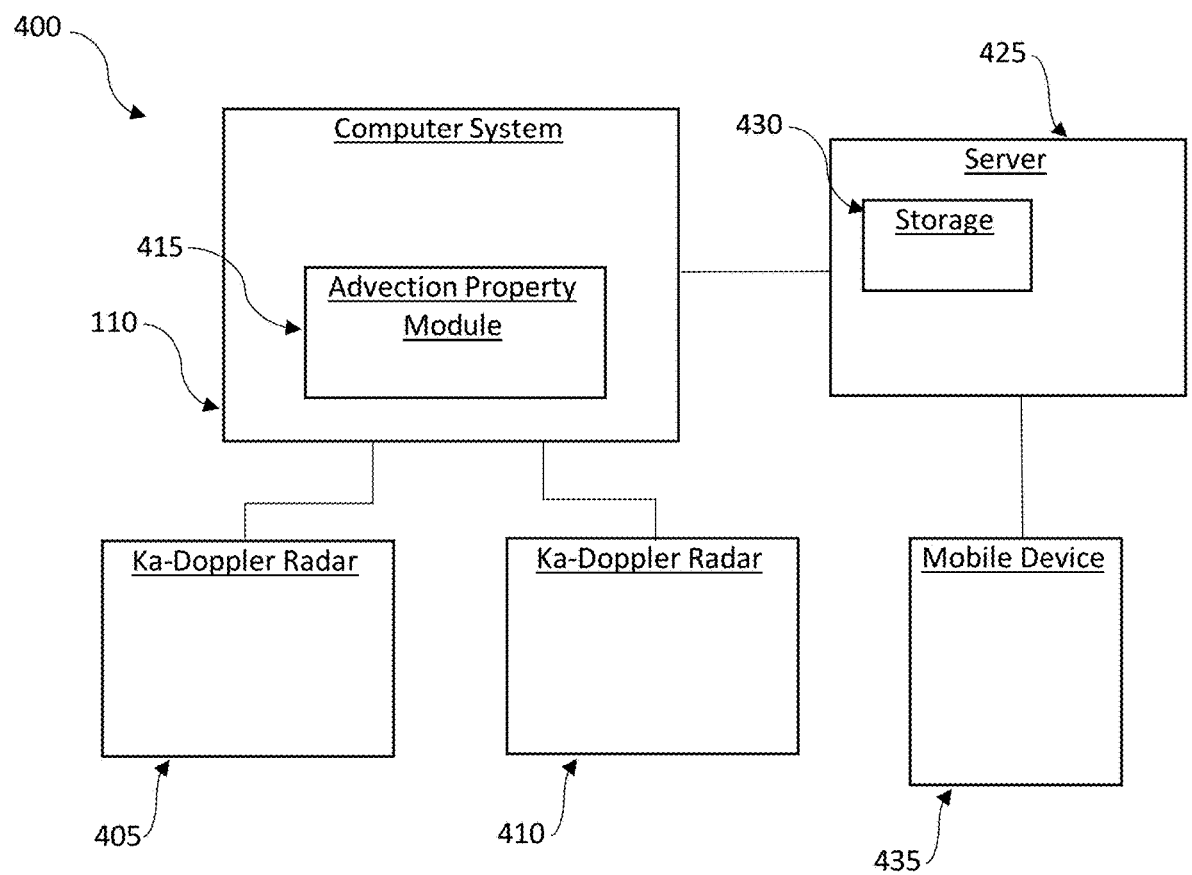
FIG. 4 depicts a block diagram of a wind collection and analysis system, in accordance with the disclosed embodiments.

In certain embodiments, a system 400, as shown in FIG. 4, can be used to collect readings associated with an ABL wind field. In one embodiment, radial velocity measurements from one or more mobile Texas Tech University Ka-band Doppler radars (TTUKa) (or other such radar instruments) can be used. The Doppler radar units, such as radar unit 405 and radar unit 410 can be in communication with a computer system 110 that is used to implement methods for determining ABL wind field advection with an advection property module 415. The computer 110 can be connected to a server 420 with associated memory 425. The server 420 can further operate or otherwise communicate with a mobile device 435.

In certain embodiments, coordinated measurements from more than one scanning remote sensing device can be used to acquire a three-dimensional volume of measurements from the same region. The measurements from each device can be combined using dual-Doppler (DD) synthesis to produce a full representation of the horizontal wind field.

It should be understood that the embodiments presented herein can be implemented using the aforementioned TTUKa radars. However, the disclosed embodiments can additionally, or alternatively, be implemented with a number of related instrument technologies. Assuming comparable spatiotemporal resolution of the underlying measurements is achieved, the methodology can be applied to measurements acquired from a scanning lidar(s), other scanning radar(s), or any other remote sensing instrument(s) providing like data coverage. If the spatially distributed measurements are acquired using degraded spatial resolution or slower volume revisit times, the disclosed embodiments may require re-validation as a final step.

FIGS. 5-8 illustrate flow charts associated with a method for accurately determining the advective properties (speed and direction) of the ABL wind field at each objectively analyzed elevation level, or planes, in accordance with the disclosed embodiments. In certain embodiments, the methods illustrated in FIGS. 5A-5D can be implemented using, for example, system 400 illustrated in FIG. 4.

Figure 5:
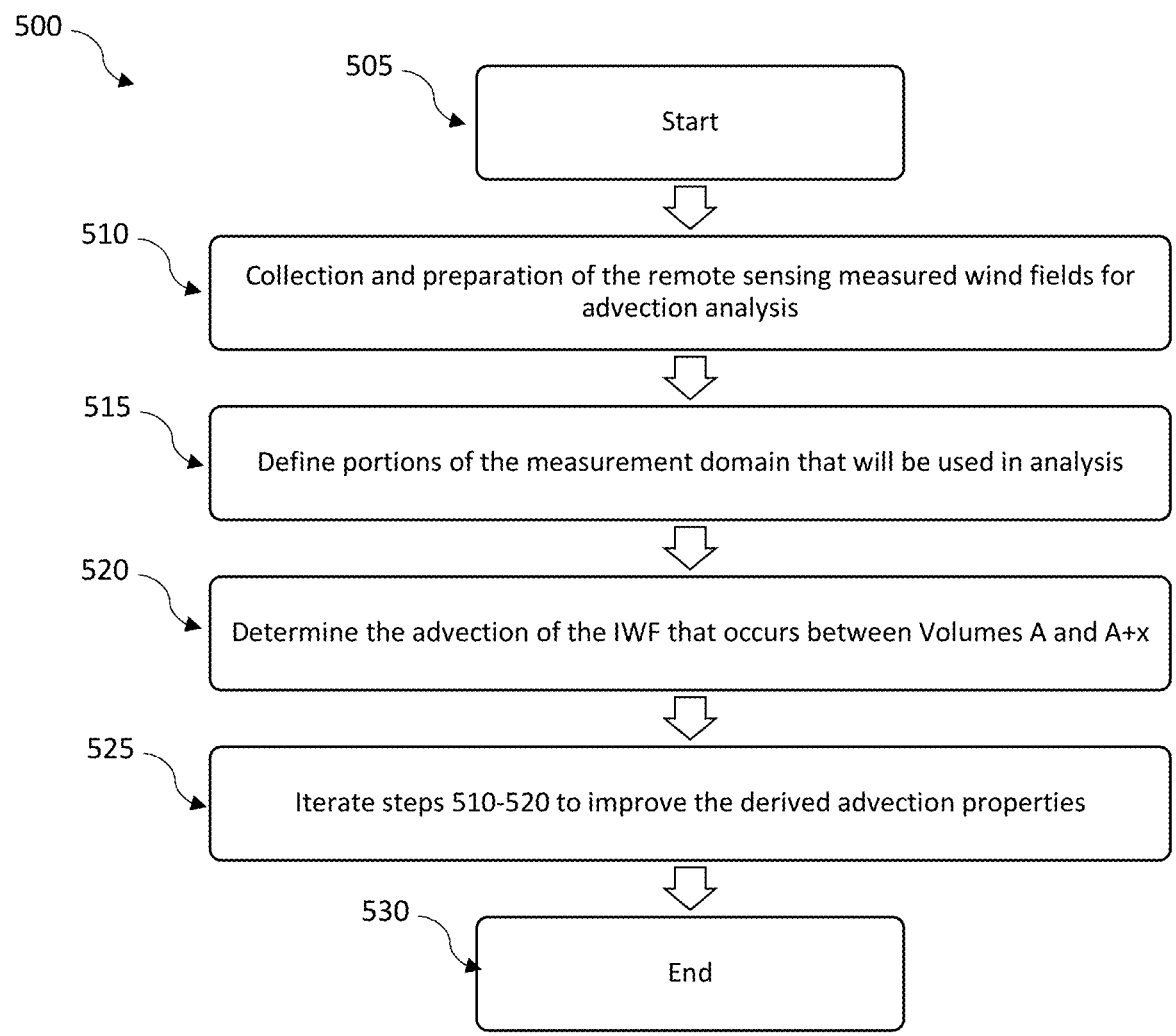
FIG. 5 depicts a flow chart associated with a method for determining ABL wind field advection properties, in accordance with the disclosed embodiments.

FIG. 5 illustrates a method 500, for accurately determining the advective properties (e.g. speed and direction) of the ABL wind field. The method begins at step 505. The method 500 generally includes the collection and preparation of the wind field data for advection analysis. At step 515 portions of the measurement domain that will be used in analysis can be further defined. Next, the advection of the IWF that occurs between a first volume A and a second volume A+x can be determined. Finally, at step 525, the accuracy of the derived advection properties can be improved through iteration of the previous steps. The method ends at 530.

Figure 6:
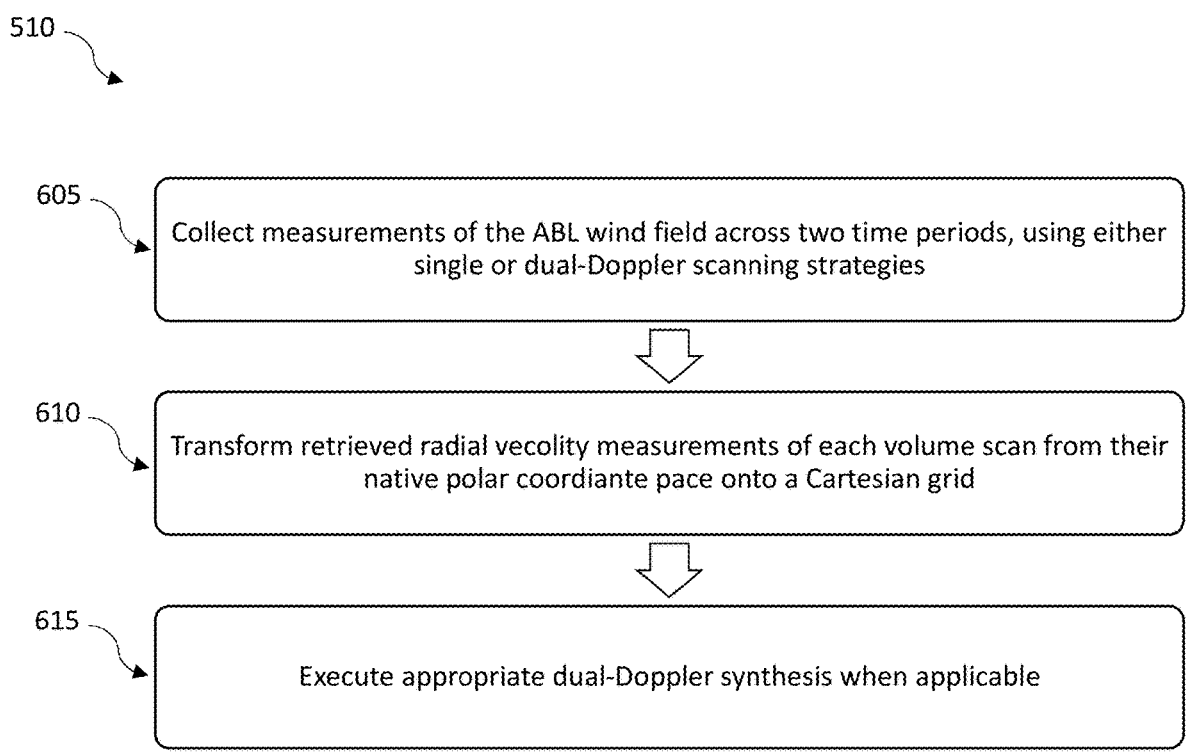
FIG. 6 depicts a flow chart detailing steps associated with a method for collecting measured wind fields for analysis, in accordance with the disclosed embodiments.

Details of step 510 are further provided in FIG. 6. Step 510 involves the collection, preparation, and objective analysis (OA) of the remotely sensed wind fields. Remote sensing instruments, such as those described in FIG. 2 and FIG. 4, utilize objective-based strategies to measure the lower portions of the ABL wind field. For example, at step 605 plan-position indicator (PPI) scanning techniques can be used to command the remote sensing instrument to scan along a fixed elevation angle while varying the azimuth of the antenna in order to document the horizontal structure of the flow. PPI strategies can be iterated across multiple elevation tilts in order to measure the horizontal structure of the wind field at varying depths of the ABL. The collection measurements at step 610 can include collection during two time periods that equate to two volumes.

Measurements can be drawn from a mobile pair of TTUKa radars, such as radar 405 and radar 410. However, to reemphasize, the application of these methods is independent of the underlying instrument technology as well as the number of remote sensing instruments used (i.e., single-Doppler [SD] or DD).

In an exemplary deployment illustrated herein, the pair of TTUKa Doppler radars 405 and 410 can be synchronized in time and perform a coordinated sequence (i.e., DD) of 50° sector scans across 15 elevation tilts ranging from 0.2° to 3.0° in increments of 0.2°. For reference, this coordinated sequence of sector scans is referred to as an individual volume scan. Other deployments could use different sector sizes, elevation tilt angles, and/or number of elevation tilts.

The spatial correlation technique discussed herein leverages ABL wind field information measured across two or more wind volumes (e.g., Volumes A and Volume A+x, where x is some finite integer). Upon the completion of an individual volume, the radial velocity measurements of each remote sensing system are transformed onto a Cartesian coordinate system via a user-defined interpolation scheme as shown at 610.

The size and grid spacing of the Cartesian grid (i.e., measurement domain) are dictated by the employed scanning strategy, the specifications of the remote sensing instrument, and various user-selected parameters. The number of elevation tilts used determines whether or not the retrieved radial velocity fields are objectively analyzed along a constant-height plane, or a plane consistent with the tilt angle used. When coordinated scanning strategies are performed between two scanning instruments, the interpolated radial velocity fields of each remote sensing instrument can be vectorially combined through DD synthesis to derive the horizontal velocity (U and V) at each grid point within the measurement domain as illustrated at step 615.

Figure 7:
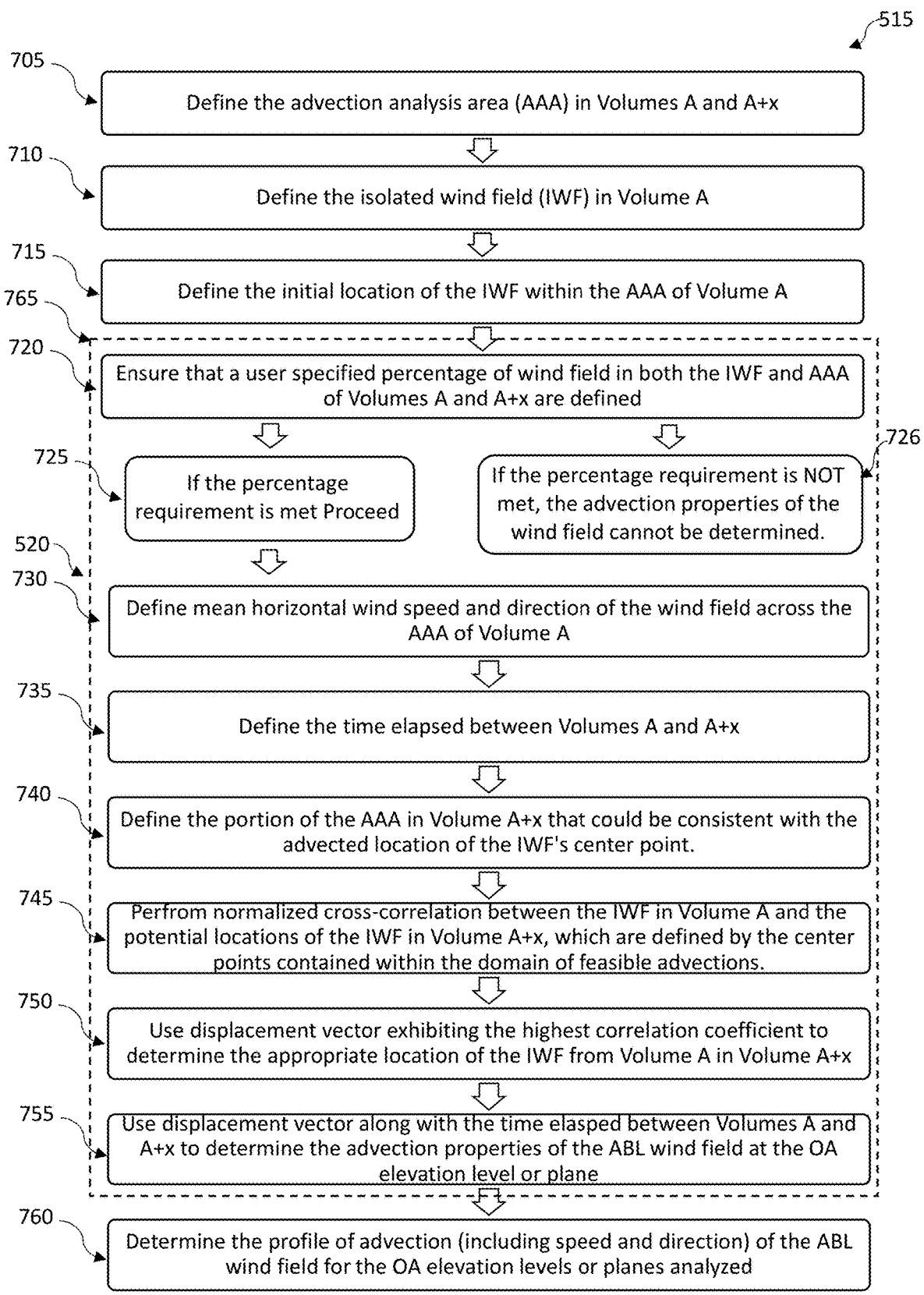
FIG. 7 depicts a flow chart detailing steps associated with a method for determining portions of a measurement domain and determining the advection of the IWF, in accordance with the disclosed embodiments.

The details of method step 515 and 520 are provided in FIG. 7. At step 515, the areas of the measurement domain that will be used in analysis can be determined. In order to accurately quantify ABL wind field advection, an isolated portion of the measurement domain (i.e., advection analysis area "AAA") can be defined as illustrated at 705. The AAA can be selected such that is free of any obstructions that may impact the flow. At 710, an isolated portion of the wind field (IWF) across the AAA can be tracked on a volume-by-volume basis to determine the inter-volume advective properties of the ABL wind field.

The dimensions and initial location of the IWF within the AAA should be selected at step 715 to spatially optimize the area across which the IWF can advect between the chosen analysis volumes, while not interacting with or advecting outside of the boundaries of the larger-scale AAA. Maximizing the area of the IWF relative to the AAA increases the confidence of the measured inter-volume advection so long as the above requirement holds true.

Note, as shown at 720, the advection of the IWF from Volume A to Volume A+x is only examined if a user-desired percentage of the wind field within both the IWF and AAA of Volume A and the AAA of Volume A+x are defined. Thus, if the percentage requirement is met, as shown at step 725, the method proceeds to step 520, but if the percentage requirement is not met, as shown at step 726, the advection properties cannot be determined and the method ends. The steps in box 765 can be performed for each OA elevation level or plane.

At step 520, the advection of the IWF that occurs between Volumes A and A+x can be determined. At step 730 the mean horizontal wind speed and direction of the wind field across the AAA of Volume A can be defined. Next, at step 735, the time elapsed between Volumes A and Volumes A+x can be defined. The portion of the AAA in Volume A+x that could be consistent with the advected location of the IWF's center point can be defined at step 740.

At step 745 the normalized cross-correlation between the IWF in Volume A and the potential locations of the IWF in Volume A+x, which are defined by the center points contained within the domain of feasible advections, can be performed. The displacement vector with the maximum value of normalized cross-correlation between the IWF in Volume A and potential locations in the IWF in Volume A+x can be used to determine the location of the IWF in Volume A+x as illustrated at step 750. To speed execution, this operation can only be performed between the IWF in Volume A and a subset of potential advection locations (i.e., domain of feasible advection solutions) in Volume A+x. Based upon empirical evidence, the inter-volume advection of the ABL wind field should be within plus or minus some velocity, and between some direction range. The mean wind speed and direction for a given constant-height plane can be defined by their respective average values measured across the AAA of Volume A. This mean wind speed and direction, the advection bounds defined empirically, and the time elapsed between Volumes A and A+x are used to define the domain of feasible advection solutions. The displacement vector, along with the time elapsed between Volume A and Volume A+x, can be used to determine the advection properties of the ABL wind field at the OA elevation level or plane as shown at 755. As illustrated at step 760, the steps illustrated at 510, 515, and 520 can be used to determine a profile of advection of the ABL wind field for the OA elevation levels or planes analyzed. The profile of advection can include both speed and direction.

Figure 12:
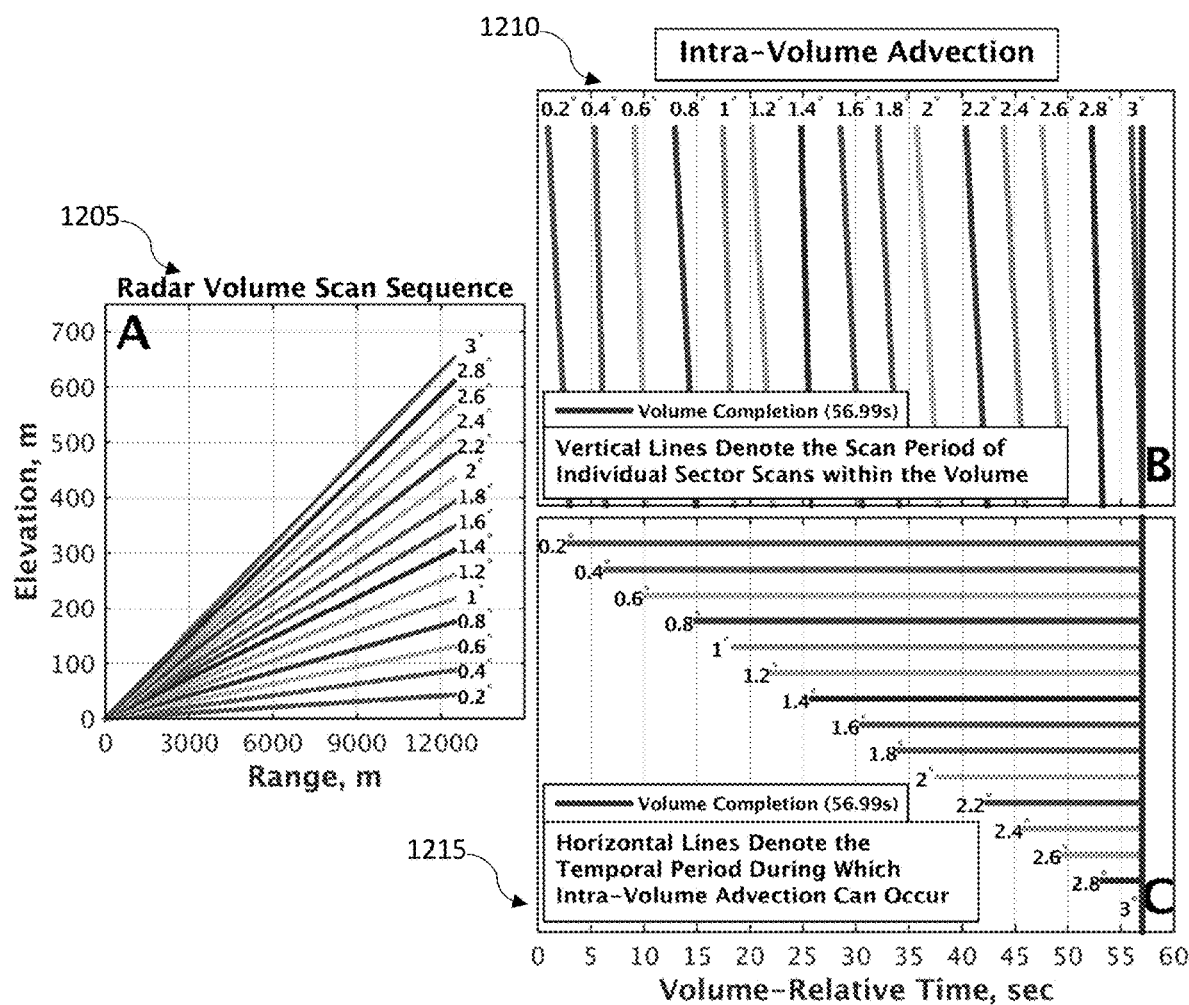
FIG. 12 depicts diagrams of properties associated with intra-volume advection, in accordance with the disclosed embodiments.

Each volume can be defined by multiple sector scans (i.e., multiple PPI scans). FIG. 12, illustrates chart 1205 of an exemplary radar volume scan sequence. Chart 1210 illustrates that the sector scans are executed at discrete time intervals within the volume acquisition period. A significant amount of displacement can occur to individual turbulence features between measurement and the reference time chosen for OA (e.g., scan initiation, scan completion, intra-volume measurement time, etc.). Chart 1215 provides an exemplary graph of the Intra-Volume advection that can occur. These spatial displacements can directly modify the structure of the wind maps following OA, and thus may impact the derived inter-volume advection. In order to ensure an accurate depiction of the wind field and its measured inter-volume advection, the radial velocity measurements used to construct a single volume must be corrected to account for this intra-volume advection.

Figure 8:
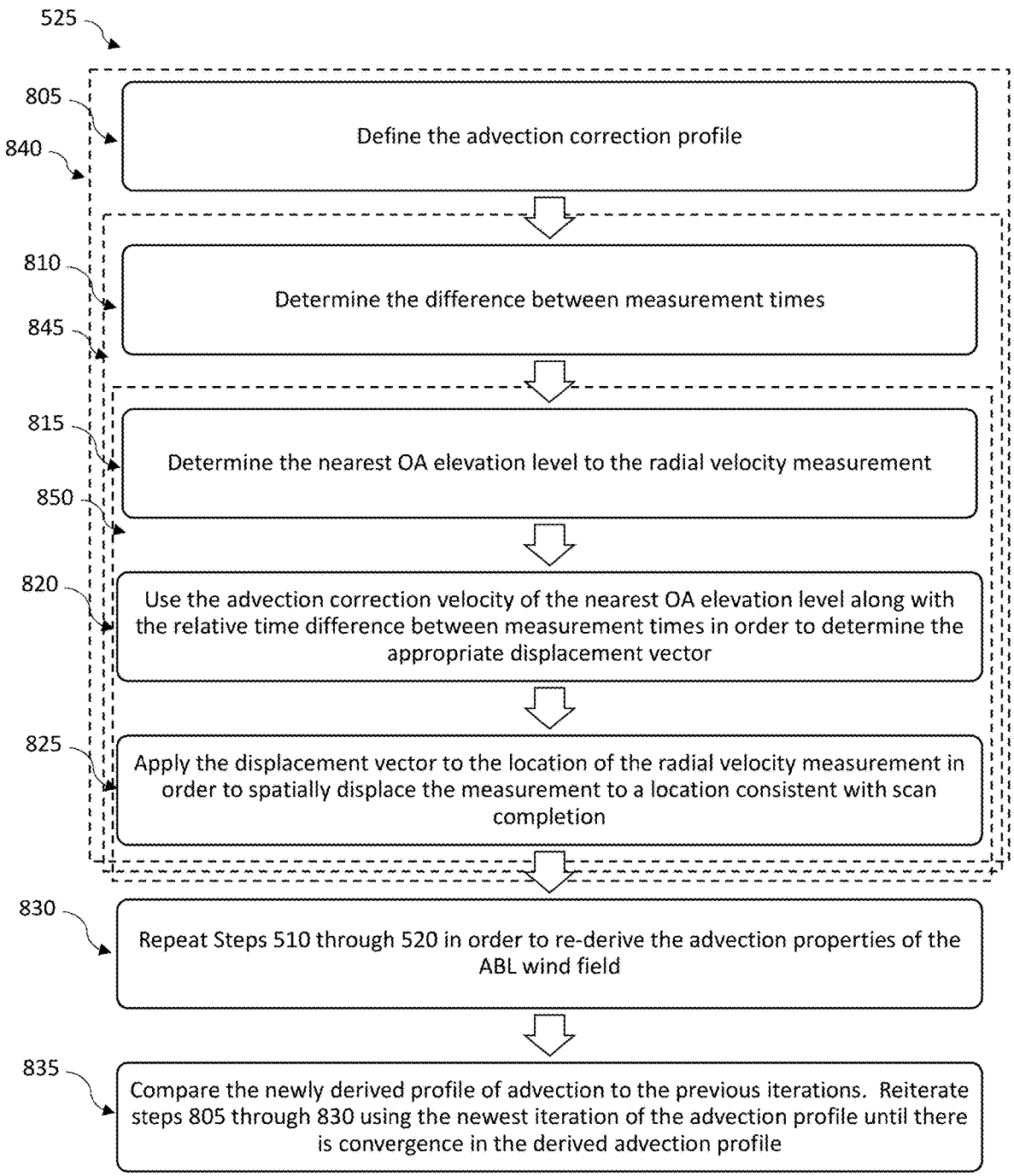
FIG. 8 depicts a flow chart detailing steps associated with a method for improving the accuracy of derived advection properties, in accordance with the disclosed embodiments.

Details of the iterative process of step 525 are provided in FIG. 8. It should be appreciated that all the steps in box 840 can be completed for both Volume A and Volume A+x. All the steps in box 845 can be competed for each remote sensing instrument used. All the steps in box 850 can be completed for each radial velocity measurement with the individual volume scan.

The iterative process of step 525 is used to account for the intra-volume advection. First, at step 805 the advection correction profile can be defined, and at step 810 the difference between time measurements can be determined. At step 815, for each individual polar radial velocity measurement, the nearest objectively analyzed constant-height plane is identified. At step 820 the appropriate displacement vector is determined for each individual polar radial velocity measurement. The spatial displacement of the correction is determined by multiplying the inter-volume advection velocity vector that was identified at the nearest constant-height plane by the time difference between measurement and the chosen reference time. The displacement vector can be applied to the location of the radial velocity measurement in order to spatially displace the measurement to a location consistent with scan completion as shown at 825. The corrected radial velocity measurements then undergo OA again followed by subsequent DD synthesis, and the inter-volume advective properties are redefined as shown at 830.

Figure 13:
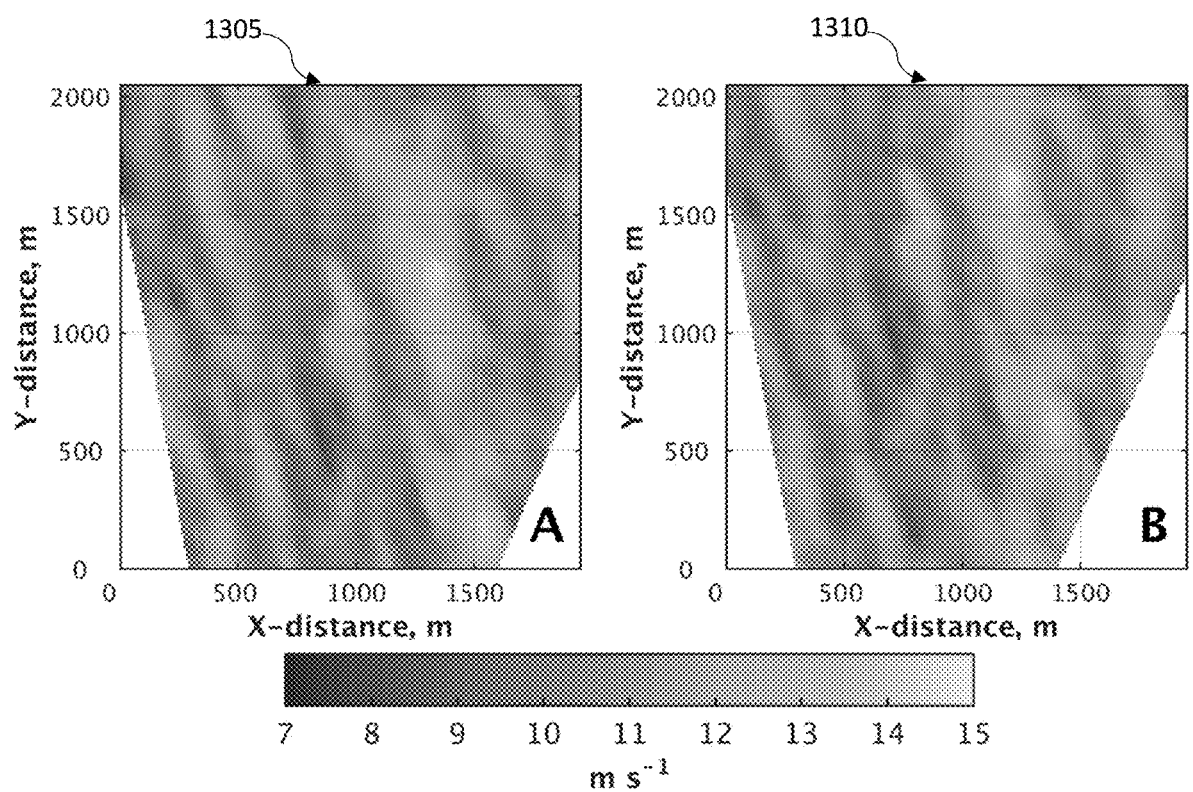
FIG. 13 depicts a diagram of enhanced accuracy of the resolved wind field that can be achieved, in accordance with the disclosed embodiments.

At step 835, the corrective procedures are iterated until there is convergence between subsequent iterations of the inter-volume advective properties. At the point of convergence, it can be assumed that the intra-volume advection of the radial velocity measurements has been properly accounted for. Through these methods, the accuracy of the resolved wind field is enhanced. This is illustrated in exemplary chart 1305 and chart 1310 provided in FIG. 13.

The following discussion provides an exemplary description of the implementation of the methods illustrated in FIGS. 5-8, and systems in FIGS. 1-4, along with exemplary data associated therewith. It should be understood that the exemplary data along with the exemplary description are provided to clarify aspects of the embodiments disclosed herein, and are not intended to limit the scope of parameters or configurations that could be employed in other embodiments.

Figure 9:
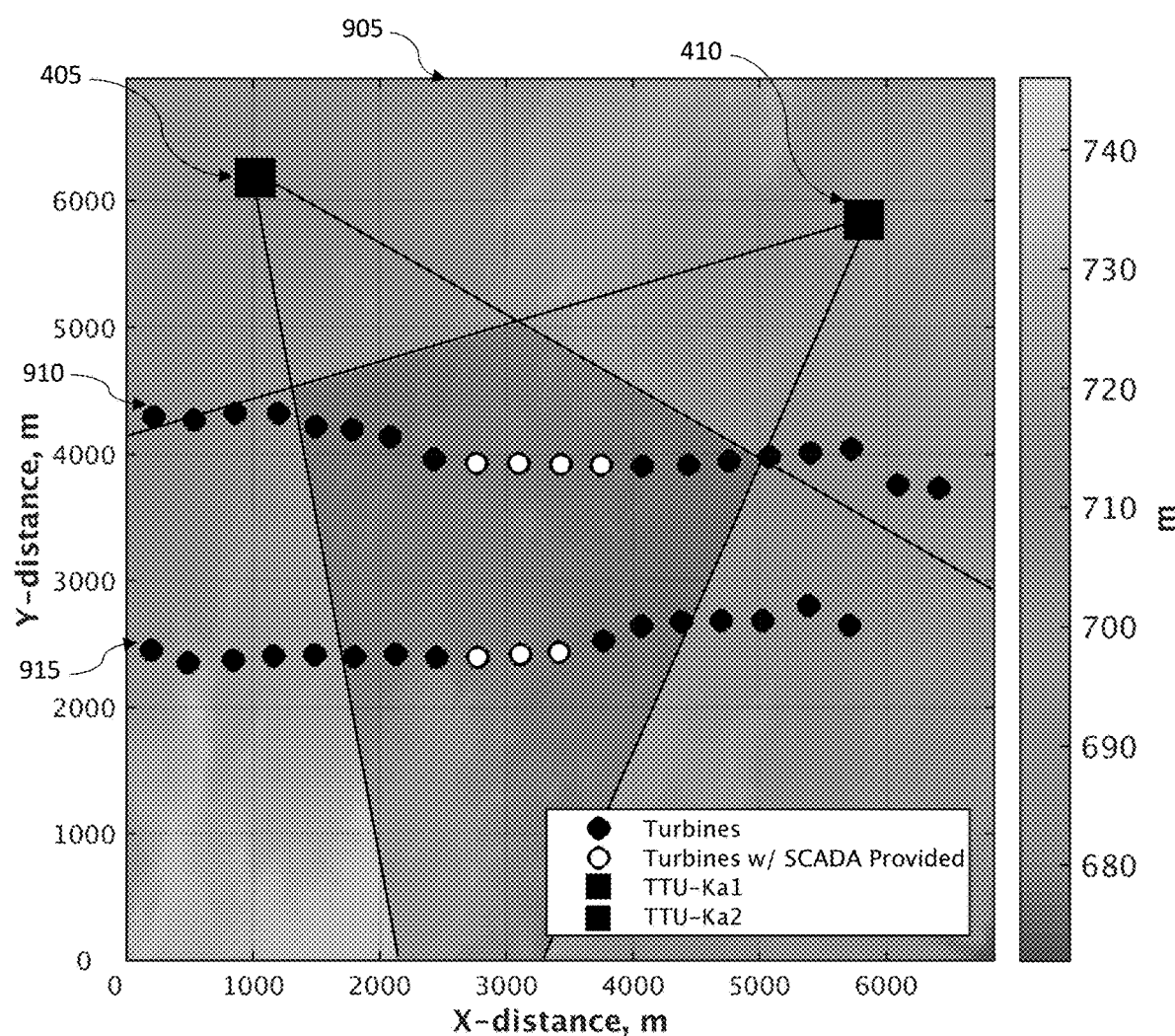
FIG. 9 depicts a diagram of a system for wind collection in proximity to a wind generation plant, in accordance with the disclosed embodiments.

In an exemplary embodiment, radar units can be deployed at or near an operational wind plant. The radars can be situated along a preselected tangent separated by a predefined distance. In FIG. 9, an exemplary deployment of the radar units in the field is illustrated. Two arrays of wind turbines including turbine array 910 and turbine array 915 are illustrated. It should be appreciated that the array of wind turbines 910 and/or turbines 915 can comprise some turbines with supervisory control and data acquisition (SCADA) provided, and some wind turbines without SCADA provided.

The first radar unit 405 and second radar unit 410 are disposed in a selected location 905. The radar units 405 and 410 can be synchronized in time, so that coordinated volumes—that can comprise 50° sector scans across 15 elevation tilts, ranging from 0.2° to 3.0° in intervals of 0.2°—can be performed. Other deployments could use different sector sizes, elevation tilt angles, and/or number of elevation tilts, and thus acquisition time may vary. In the exemplary case, a single volume takes an average of 59.5 s to acquire.

Volumetric radial velocity measurements from each of radar 405 and radar 410 can be edited to ensure data quality and then transformed onto a Cartesian gridded DD domain via OA. The DD domain can be defined by the overlapping portions of the two radar sectors and can vertically extend through the depth of the wind turbine rotor sweep. The scanning strategies used in the example deployment enable the development of a multi-kilometer by multi-kilometer DD domain with a lateral and vertical grid spacing of 10 m. In order to ensure a terrain-following representation (i.e., constant-height above ground level "AGL" planes) of the measured wind fields, slight variations in surface elevation that exists across the DD domain, and elevation difference between the two radar deployment locations, can be accounted for using surface elevation data (e.g., one-arc second digital raster). Such data can be collected on site or can be taken from known resources such as the United States Geological Survey (USGS) National Elevation Dataset.

A Barnes interpolation scheme can be used to interpolate the height-corrected radial velocity measurements onto the Cartesian DD grid. Note that in practice, many interpolation techniques exist that can be used to interpolate the height-corrected radial velocity measurements onto the Cartesian DD grid. The interpolated radial velocity fields of each TTUKa Doppler radar (i.e. radar 405 and radar 410) can then undergo DD synthesis to yield the three-dimensional structure of the horizontal wind field.

Figure 10:
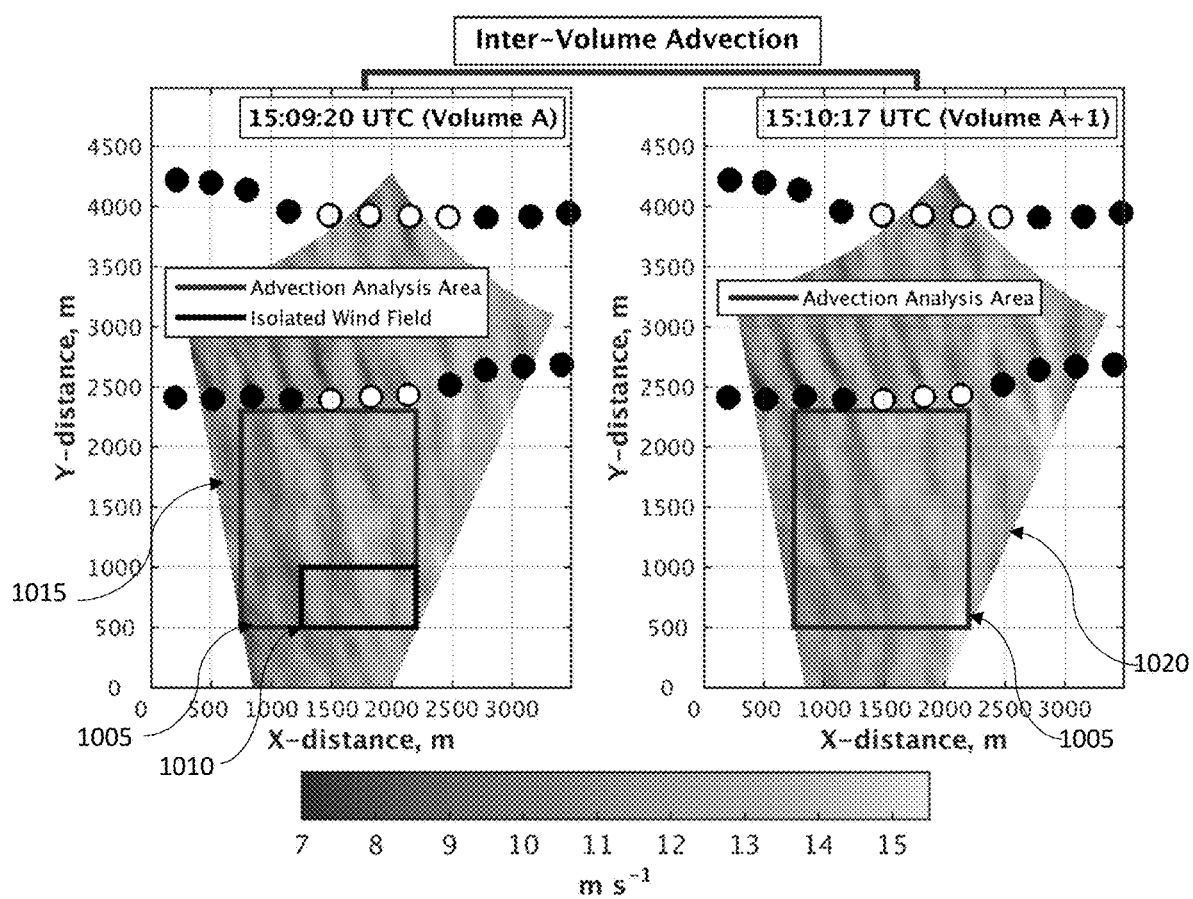
FIG. 10 depicts a diagram of an inter-volume advection area, in accordance with the disclosed embodiments.

In the embodiments disclosed herein, a portion of the DD measurement domain located upstream of the wind plant is designated as the AAA to ensure the accuracy of the measured inter-volume advection. In the exemplary embodiment illustrated herein, the AAA and IWF measured 1.5 km by 1.7 km and 1 km by 0.5 km respectively. In FIG. 10, the AAA is shown as box 1005 and the IWF is illustrated by box 1010. The advection of the IWF 1010, which is initially aligned with the lower right-hand corner of the AAA 1005 in Volume A 1015 given the prevailing wind direction from the southeast, is examined across successive analysis volumes (i.e., Volumes A 1015 and Volume A+1020).

The spatial correlation technique is iterated at each of the constant-height planes to quantify the advection of ABL wind field at each available analysis height. In accordance with the methods disclosed herein, intra-volume advection corrections (i.e. step 835) can be applied.

Figure 11:
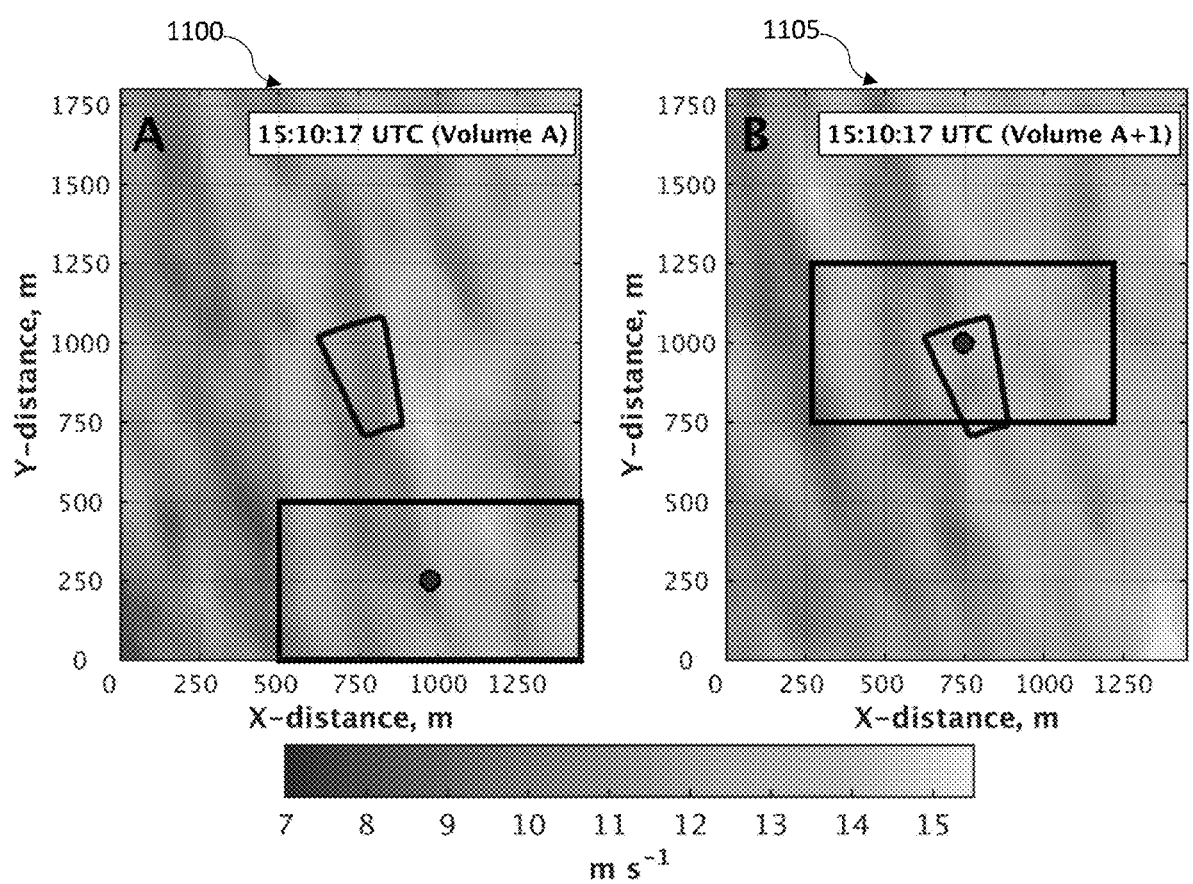
FIG. 11 depicts a diagram of results from a spatial correlation technique that can be used to determine an inter-volume advection speed and direction, in accordance with the disclosed embodiments.

For example, as shown in chart 1105 in FIG. 11 (as compared to chart 1100), between 15:09:20 UTC and 15:10: 17 UTC, this spatial correlation technique can be used to determine an inter-volume advection speed and direction of 13.5 m s$^{-1}$ and 163.0° respectively. This inter-volume advection is 1.9 m s$^{-1}$ faster, and 2.2° counterclockwise, of the mean flow measured across the constant-height respective AAA in Volume A. The measured advection is not consistent with any layer average wind speed or direction that can be determined through the depth of the ABL examined.

Figure 14:
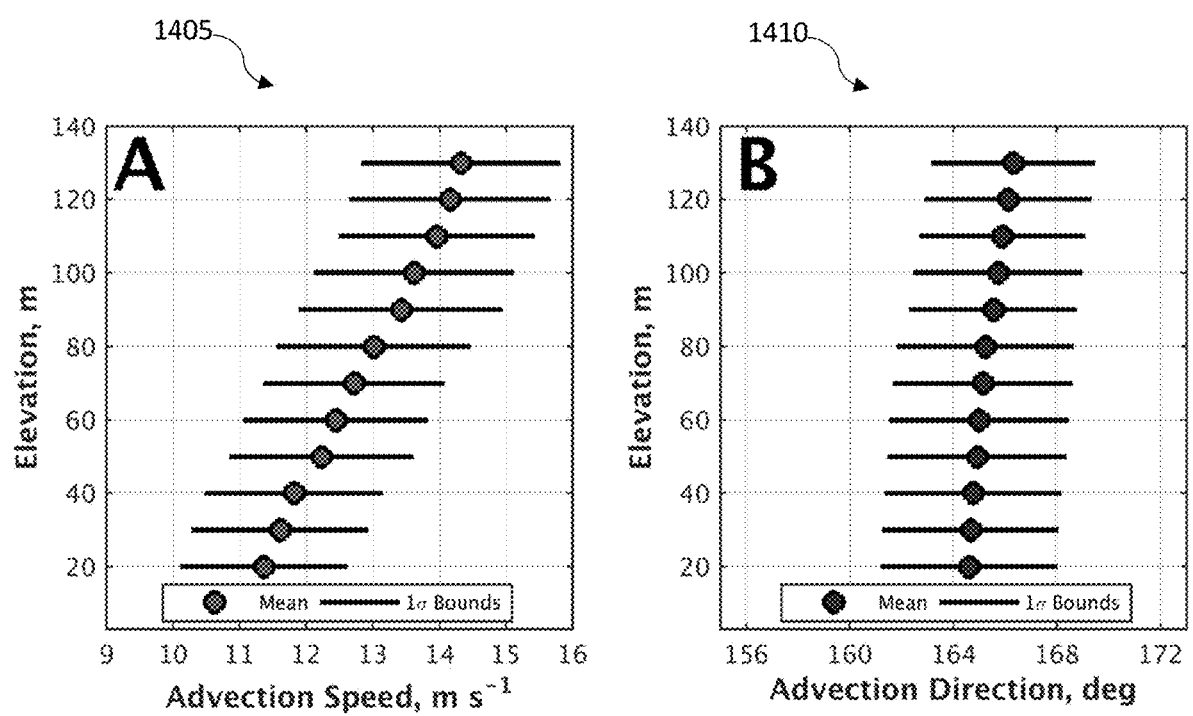
FIG. 14 depicts a chart of advection speed and direction as a function of elevation, in accordance with the disclosed embodiments.

In the exemplary application, the measured advection characteristics of the ABL wind field were examined across 22 consecutive radar volumes (totaling 264 individual constant-height planes [i.e., 12 layers per DD volume]). Considering all constant-height layers between 20 m and 130 m, the ABL wind field advects at an average speed and direction of 12.9 m s$^{-1}$ and 165.3°, respectively, as illustrated by chart 1405 and chart 1410 provided in FIG. 14. However, there are considerable differences in the properties of advection with height. The slowest advection occurs at 20 m AGL at 11.4 m s$^{-1}$, while the fastest occurs at 130 m at 14.3 m s$^{-1}$. The advection speed and direction increase with height at an average rate of 2.7 m s$^{-1}$ and 1.5° per 100 m, respectively.

Figure 15:
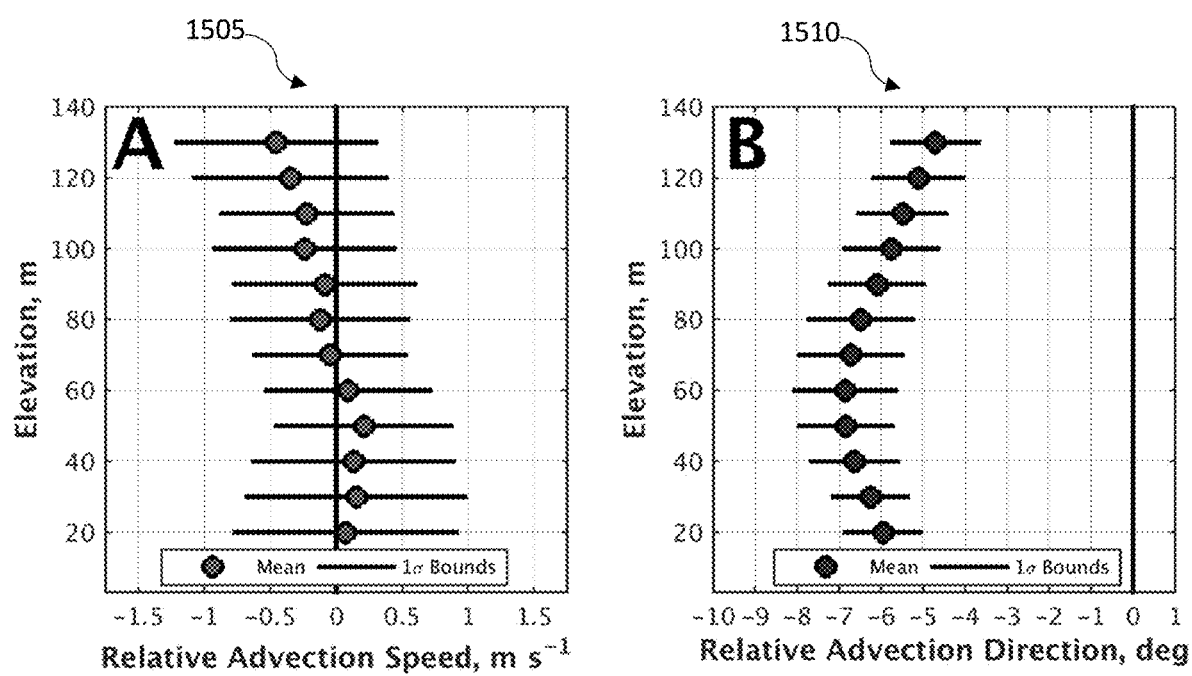
FIG. 15 depicts a chart of relative advection speed and relative advection direction as a function of elevation, in accordance with the disclosed embodiments.

Comparing the resulting properties of advection with average AAA wind speeds and directions indicates that Taylor's hypothesis is not an accurate representation of the momentum advection through the analyzed layer of the ABL as shown in chart 1505 and chart 1510 in FIG. 15. Across the lower portions (20 m-60 m) of the domain, the momentum field is advecting an average of 0.1 m s$^{-1}$ faster than the local mean wind speed. Between 90 m and 130 m the momentum field is advecting an average of 0.3 m s$^{-1}$ slower than the local mean wind speed. While the speed of advection can be faster or slower than the local mean wind speed depending on the height, the direction of advection ranges from 4.7° to 6.9° counterclockwise of the local mean wind direction.

The methods and systems disclosed are able to provide a direct estimate of ABL wind field advection, thereby enabling a refined space-to-time conversion of the measured wind fields. This space-to-time conversion process facilitates the extraction of sub-volume time scale temporal variation in the flow, and thus the embodiments disclosed herein are able to remove a principal handicap of scanning instruments (i.e., temporal frequency of observations) without sacrificing its spatial footprint advantage.

In one exemplary application of the methods and systems disclosed herein, long lead time turbine inflow forecasts can be provided. Historically, extended previews (i.e., in excess of 10 s) of the advancing wind field are unobtainable due to the restricted measurement range of nacelle-mounted technologies. According to the disclosed embodiments, long-range scanning remote sensing instruments can drastically expand the extent of the measured wind field, thereby increasing the preview time available (e.g. up to 60 s in advance). In addition to the typical benefits of proactive wind turbine control, long lead time turbine inflow forecasts can, for example, reduce adverse wind turbine loading.

In certain embodiments, high-fidelity turbine inflow previews can be generated from DD volume-based gridded wind fields using advection knowledge derived from the spatial correlation methods and systems disclosed. DD volume information is available throughout the rotor sweep, and intra-volume advection corrections are implemented using the methods previously disclosed.

Figure 16:
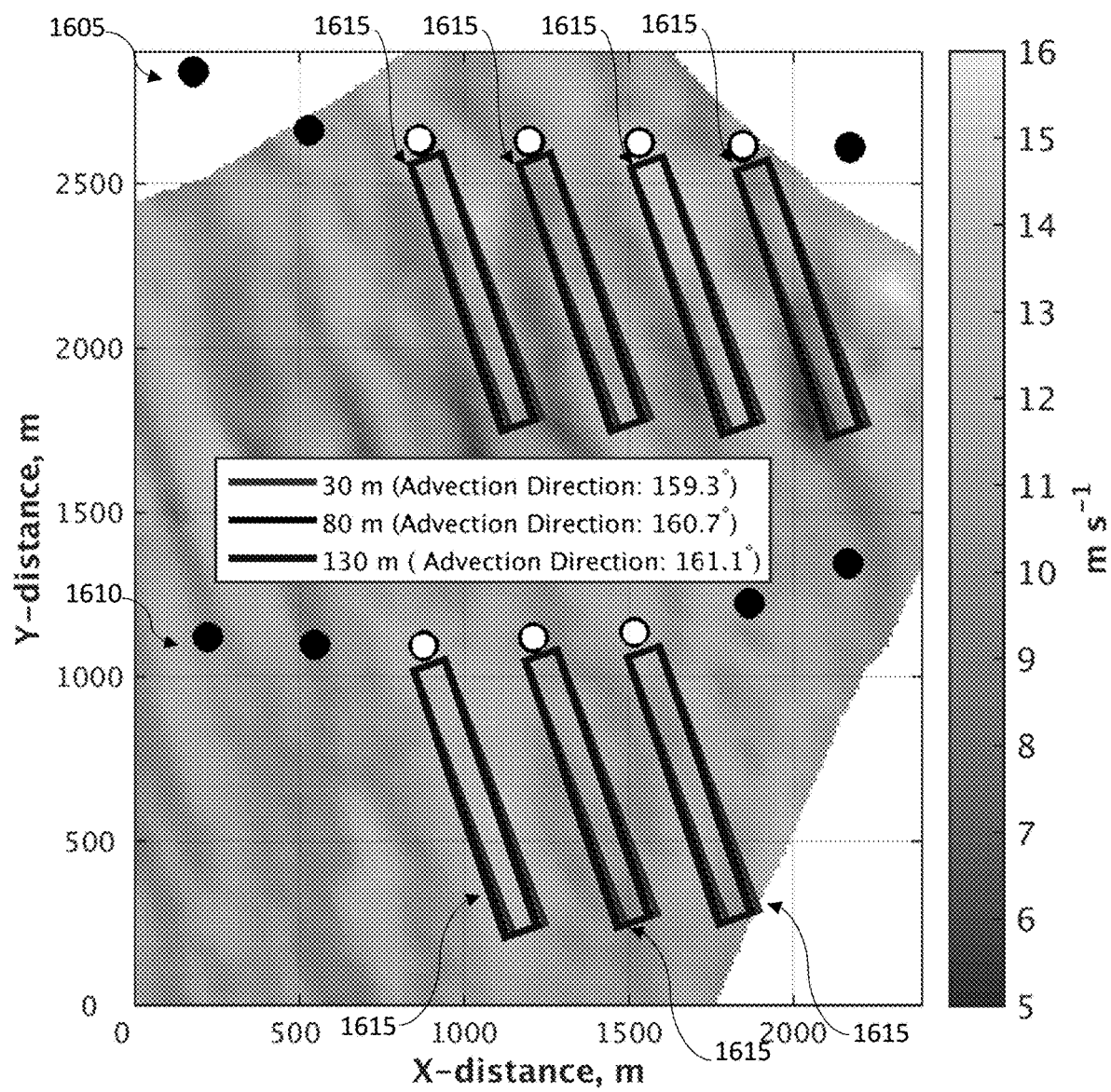
FIG. 16 depicts a diagram of a bounded inflow region of a wind field, in accordance with the disclosed embodiments.

In order to provide a continuous forecast of turbine inflow conditions, space-to-time extractions must be made at an appropriate distance and orientation upstream of each turbine to account for the duration of time between DD volume revisits (e.g. ~59.5 s). In accordance with the advection direction, lateral bounds are placed upstream of each turbine to encapsulate the horizontal wind field that will advect through the rotor sweep over the period being analyzed. In FIG. 16, this is illustrated for an array of turbines 1605 and a second array of turbines 1610.

The height-dependent diameter of the wind turbine rotor sweep is used to define the lateral width of these bounds at each analysis height. The resulting three-dimensional region upstream of the wind turbine is subsequently referred to as the bounded inflow region 1615. The time at which wind measurements contained within this region advect through the wind turbine rotor sweep is determined by dividing the upstream distance of each measurement by the height-respective advection speed. Analyses of the extracted wind information at user-defined time intervals (e.g., one-second) can be conducted to develop a turbine inflow forecast across the rotor sweep. For the illustrative example provided in FIG. 16, one-second forecast windows were employed. However, it should be appreciated that other forecast windows could be used without departing from the scope of the disclosure herein.

For each of the pre-defined time intervals, advected DD measurements will exist at various locations across the rotor sweep. While a simple rotor sweep area (RSA) average of the forecasted inflow can be calculated, it cannot quantify various inflow characteristics (e.g., wind shear and veer across the rotor sweep) that can directly impact wind turbine performance.

Figure 17:
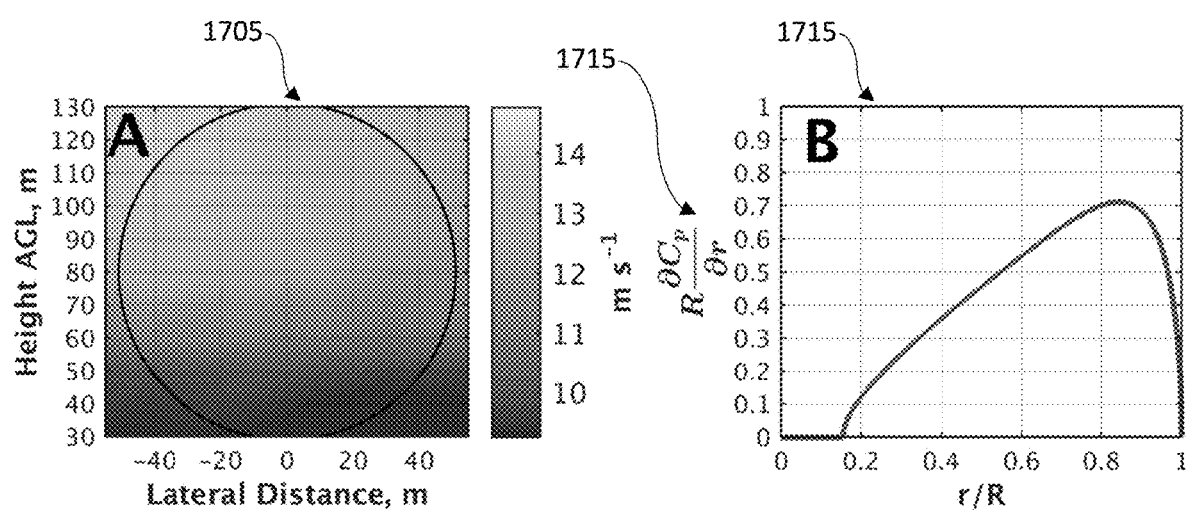
FIG. 17 depicts a chart of a rotor effective wind speed (REWS) forecast derived from a two-dimensional weighting function, in accordance with the disclosed embodiments.

For this example, analysis of the incoming distribution of velocity measurements within a one second forecast time window, as shown in chart 1705 of FIG. 17, enables the development of a rotor effective wind speed (REWS) forecast. The REWS forecast can be determined by applying a two-dimensional weighting function, as illustrated by formula 1710, and chart 1715 of FIG. 17, to the distribution of advected velocity measurements within the forecast time window. The two-dimensional weighting function 1715 accounts for spanwise variations in power extraction that occur across the RSA by modeling both blade tip and root losses. Prandtl's tip loss function can be used to model these losses. Other methods can be applied to determine a REWS.

The accuracy of the REWS forecast can be further enhanced if location differences between the advected velocity measurements and individual wind turbine blades can be determined. However, because exact blade locations are unknown in this embodiment, it is assumed that the advected velocity measurements equally interact with the wind turbine blades.

Figure 18:
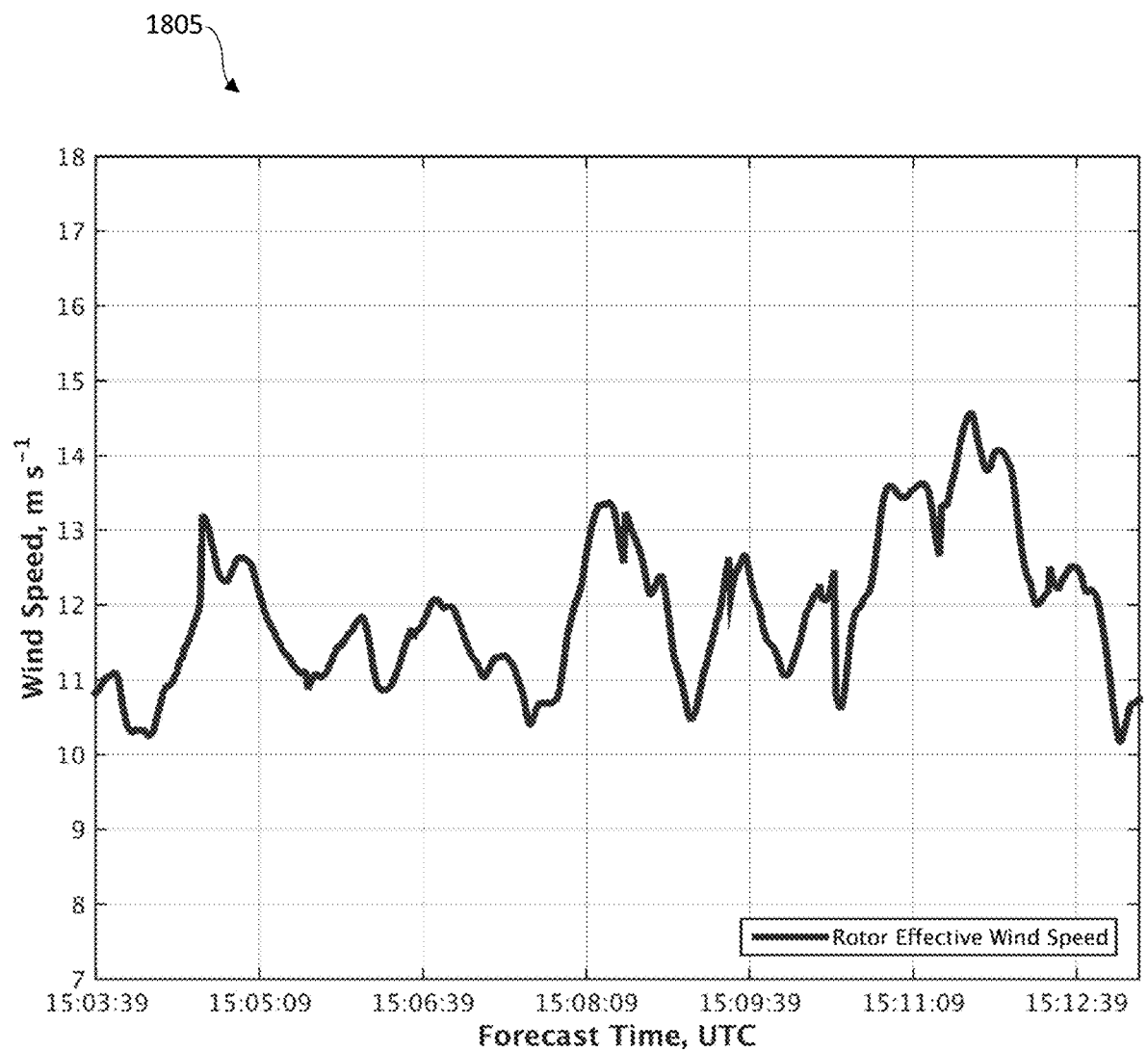
FIG. 18 depicts a chart of the turbine-inflow wind speed as a function of the forecast time, in accordance with the disclosed embodiments.

An exemplary REWS inflow forecast derived from the DD wind maps of 10 consecutive volumes (15:03:27 UTC-15:13:13 UTC) is shown in chart 1805 FIG. 18.

Nacelle-measured wind speeds can mischaracterize the inflow and inherently only represent a point measurement. Therefore, Nacelle-measured wind speeds cannot be relied upon for full validation of a REWS forecast that leverages wind information across the depth of the rotor sweep. Analysis of other turbine signals (e.g., blade pitch, generator torque, rotor speed, etc.) can therefore be used to examine the REWS forecast validity.

Generally, within region three of the power curve, the principal objective of the wind turbine controller is to maintain the rated generator speed by strategically manipulating wind turbine blade pitch. A pitch schedule can be used to convert the REWS forecast to an analogous blade pitch forecast. If the REWS forecast is accurate, the corresponding blade pitch forecasts denote optimal wind turbine operation.

Figure 19:
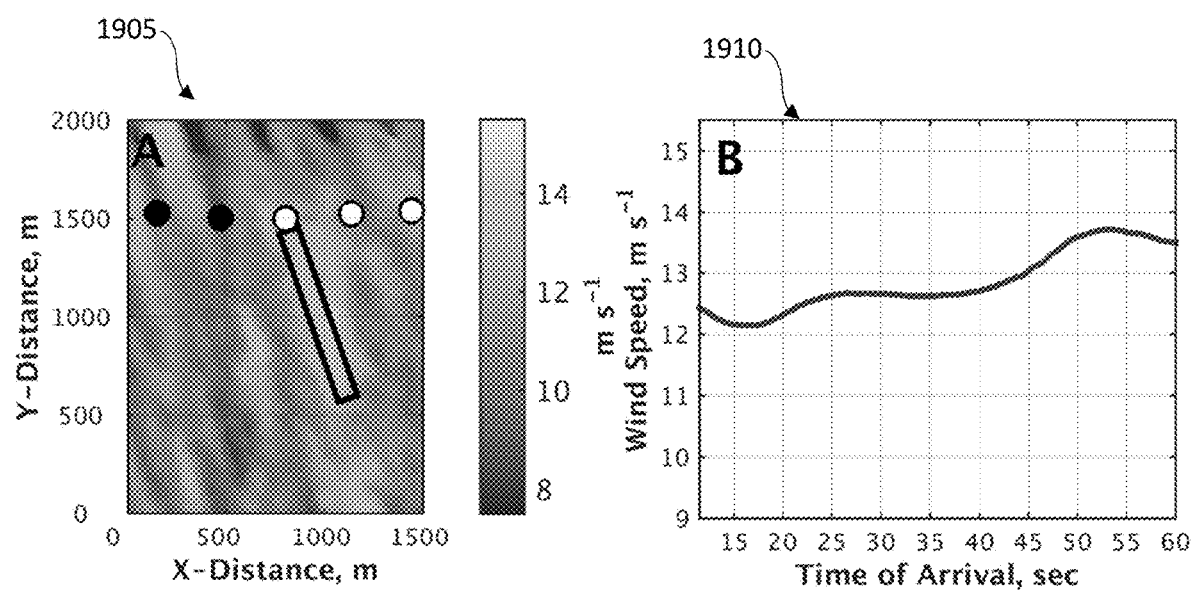
FIG. 19 depicts a chart of dual Doppler volumetric measurements and the turbine-inflow wind speed, in accordance with the disclosed embodiments.

In the exemplary case presented herein, DD volumetric measurements, shown in detail 1905 of FIG. 19, can be used to develop a sixty second forecast of the turbine inflow REWS, as illustrated by chart 1910 of FIG. 19, and the optimal blade pitch settings.

Reactive fluctuations in blade pitch can adversely impact both wind turbine power performance and loading, whereas leveraging the REWS forecast combined with the blade pitch schedule allows for a more stable, proactive blade pitch control scheme when measurements are available.

In another embodiment of the spatial correlation technique and forecast methodology disclosed herein, long lead time forecasts of turbine inflow wind direction can be extracted from the DD measurements. These wind direction forecasts enable advanced yaw control of wind turbines, which has the ability to improve wind turbine performance, either through a reduction of yaw error, or strategic yaw misalignment.

Figure 20:
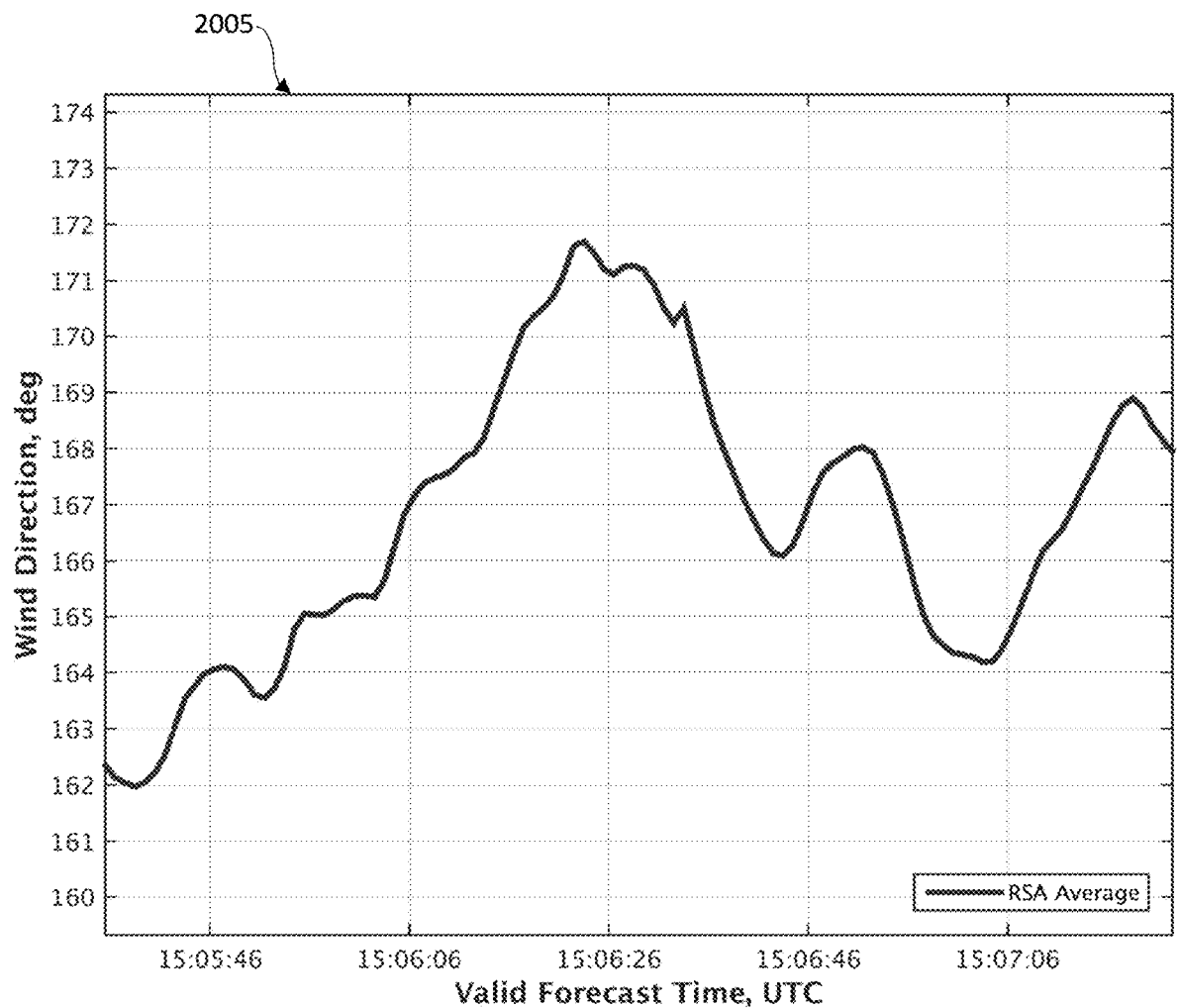
FIG. 20 depicts a chart of the turbine-inflow wind direction as a function of forecast time, in accordance with the disclosed embodiments.

As an example, a two-minute period (15:05:26 UTC-15:07:22 UTC) of DD measurements was used to extract the turbine inflow wind direction time history shown in chart 2005 of FIG. 20. Analyses of wind direction information across the rotor sweep further allows for the quantification of wind variability (e.g., veer) in both the horizontal and vertical dimensions of the rotor sweep. Turbine inflow forecasts of wind direction can therefore reduce operational yaw error and provide a more accurate assessment of the optimal inflow orientation.

In another embodiment of the spatial correlation technique and forecast methodology, long lead time turbine inflow forecasts of various atmospheric turbulence characteristics (e.g., turbulence intensity (TI), scale, etc.) can be provided.

Temporal variation in point measurements is traditionally used to discern ABL TI. However, velocity measurements derived from scanning instruments typically lack the temporal frequency required to determine TI using standard techniques. An accurate determination of ABL wind field advection as described herein, allows TI to be extracted from the spatially distributed velocity measurements of scanning instruments through analysis of spatial wind field variability (i.e., spatial turbulence intensity "STI").

In accordance with the disclosed embodiments, in order to determine the value of STI assigned to an individual location, spatial wind field variability can be examined across a defined area. The along-wind length of this area corresponds to the portion of the ABL wind field that advects past the location of interest over some desired time period (e.g., 30 s, or other such time period) and can be determined by multiplying the advection speed of the ABL wind field by the time period of interest. The lateral width of this area varies with the scanning strategies employed, the parameters of OA, and the measurement location relative to the remote sensing instrument. The STI magnitude assigned is defined as the ratio between the standard deviation and mean of the measured wind field within the defined area. These spatially defined areas can be developed about each Cartesian grid point within the measurement domain in order to transform the spatially mapped velocity field to an analogous map of STI.

The same methods can be applied to both the longitudinal and lateral components of the wind field to determine STI in component form (i.e., $STI_U$ and $STI_V$). The longitudinal (u) and lateral (v) components of the wind field can be defined using equation (1) as follows:

$$STI_U = WS * \sin(\theta) \text{ and } STI_V = WS * \cos(\theta) \qquad (1)$$

where theta ($\theta$) quantifies the difference between an individual wind direction measurement and the mean wind direction.

Atmospheric turbulence can be idealized as comprising varying size eddies superimposed upon one another. Thus, the scale and size distribution of atmospheric turbulence can be examined by segmenting the turbulent wind field component that can be determined by removing the height-respective mean wind speed from the flow by its magnitude.

The relative intensity of atmospheric turbulence can be quantified, in one example, by normalizing the turbulent wind field component by the standard deviation of the flow. Subsequent segmentation of these normalized fields by some standard deviation threshold (i.e., +A$\sigma$) can be used to resolve the varying scales and size distribution of atmospheric turbulence. The same methods can be applied to DD synthesized wind directions to similarly extract the turbulent wind direction spatial scales.

In yet another embodiment, improved wind turbine wake assessment can be provided. Wind turbine wakes are typically assessed by defining a deficit relative to a singular inflow value or some surrounding ambient wind speed. This definition assumes that the reference velocity can adequately characterize the varying inflow conditions that elicit the downstream structure of the wake or that the averaging time is long enough to account for this variability. However, as the length of the wind turbine wake grows, wake velocities can become increasingly uncorrelated with the singular reference velocity. This discrepancy increases the potential error of wind turbine wake assessments, especially if one is focused on wake evolution on shorter time scales.

In order to accurately quantify velocity deficits in a turbine wake, comparisons can be made to the respective inflow magnitudes prior to advection through the wind turbine rotor sweep. In aspects of the disclosed embodiments, a continuous forecast of the temporally varying inflow conditions can be used to make this comparison. A wake-tracking algorithm can be used, in accordance with the methods and systems disclosed herein, to determine the downstream location of the wind turbine wake. The time when the downstream wake velocities would have advected through the wind turbine rotor sweep is determined by dividing the downstream distance of the wake measurement to the turbine by the inter-volume advection speed. The height-specific inflow velocities at each time of interest can then be extracted from the inflow and the wake velocity deficit objectively determined.

Figure 21:
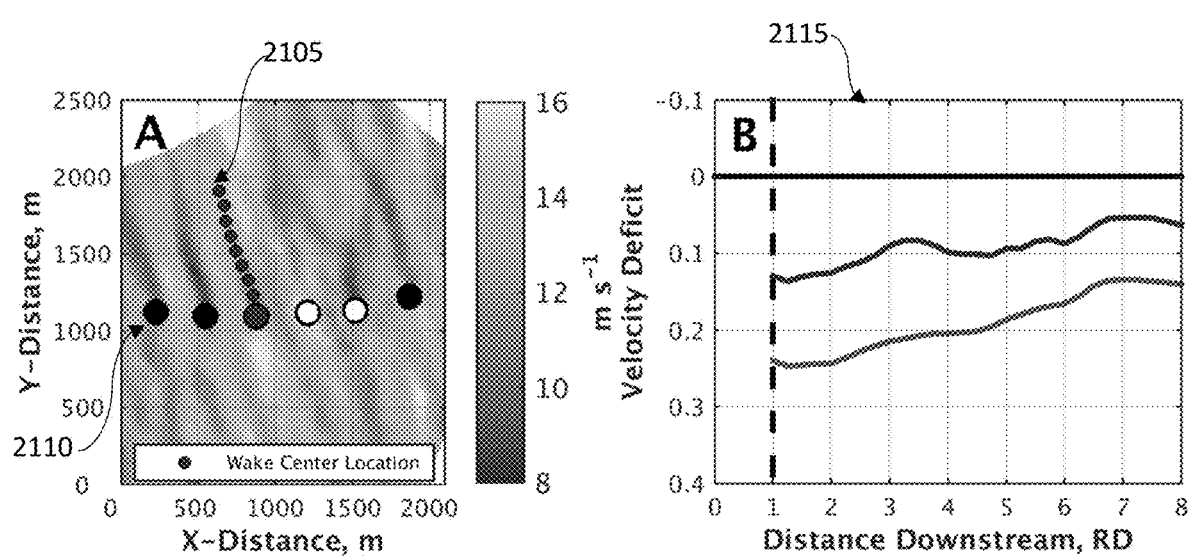
FIG. 21 depicts a diagram of enhanced wind turbine wake assessment, in accordance with the disclosed embodiments.

The benefit of incorporating these methods into wind turbine wake assessment is demonstrated in FIG. 21, wherein a transient gust 2105 is situated within the inflow of a turbine in turbine array 2110 located in the lead (i.e., southern) row of a power plant. However, the magnitude of the turbine inflow at this time, may be inconsistent with the inflow which passed through the rotor previously and resulted in the downstream wake structure.

In the exemplary embodiment illustrated in FIG. 21, the magnitude of the turbine inflow is defined by the mean wind field contained within the bounded inflow region between two and four RD upstream at hub height. A comparison of the wake velocities to their respective inflow magnitude, as opposed to the two to four RD averaged velocity at the DD synthesis time, yields a 46.7% reduction in the average wake velocity deficit measured between one and eight RD downstream as shown in chart 2115 of FIG. 21. This result makes sense, since the singular reference would have comprised the gust, the predicted deficit would have been much larger, when in reality the inflow wind speeds responsible for the wake structure were far less. These results demonstrate how the inclusion of advection can be used to reliably quantify variations in wake structure at much smaller time scales.

Based on the foregoing, it can be appreciated that a number of embodiments, preferred and alternative, are disclosed herein. For example, in an embodiment, a method for determining wind field advection speed and direction comprises collecting at least two wind volumes from an ABL wind field, defining portions of a measurement domain within the at least two wind volumes for analysis, determining advection of an isolated wind field between the at least two wind volumes, and iterating a process of correcting for intra-volume advection, objective analysis, and determining the inter-volume advective properties; wherein upon convergence of a measured advection profile, the advective properties of the ABL wind field are derived.

In an embodiment the at least two wind volumes further comprise ABL wind measurements collected across at least two time periods. In an embodiment, the at least two wind volumes are measured using at least one of a scanning radar, a scanning lidar, or another scanning remote sensing instrument providing like data coverage.

In an embodiment the method further comprises transforming the ABL wind field measurements from a native coordinate system to another coordinate system. In an embodiment, defining portions of the measurement domain within the at least two wind volumes for analysis further comprises: defining an advection analysis area in each of the at least two wind volumes, defining the isolated wind field in the first of the at least two wind volumes, and defining an initial location of the isolated wind field within the advection analysis area of the first of the at least two wind volumes.

In an embodiment the method further comprises determining advection of the isolated wind field between the at least two wind volumes further comprises: determining a mean horizontal wind speed and wind direction of the first wind volume across the advection analysis area, determining a time elapsed between the first and latter of the at least two wind volumes, and defining a domain of feasible advection solutions in a latter of the at least two wind volumes.

In an embodiment the method further comprises performing cross-correlation between the isolated wind field in the first wind volume and a domain of feasible advection solutions in the latter of the at least two wind volumes. In an embodiment the method further comprises using a displacement vector exhibiting a highest correlation coefficient to identify a most likely location of the isolated wind field in the latter of the at least two wind volumes. In an embodiment the method further comprises defining an advection speed and direction according to the displacement vector and the time elapsed between the first wind volume and latter of the at least two wind volumes.

In another embodiment a system for determining ABL wind field advection speed and direction comprises at least one sensor; at least one processor; and a storage device communicatively coupled to the at least one processor, the storage device storing instructions which, when executed by the at least one processor, cause the at least one processor to perform operations comprising: collecting at least two wind volumes from the ABL wind field, defining portions of the measurement domain within the at least two wind volumes for analysis, determining the advection of an isolated wind field between the at least two wind volumes, and iterating a process of: correcting for intra-volume advection, objective analysis, and determining the inter-volume advective properties comprising speed and direction; wherein upon convergence of the measured advection profile, the advective properties of the ABL wind field have been appropriately derived.

In an embodiment, of the system the at least one sensor comprises at least one of a scanning radar, a scanning lidar, and/or another scanning remote sensing instrument providing like data coverage. In an embodiment, the at least two wind volumes further comprise ABL wind measurements collected across at least two times with at least one of a scanning radar, a scanning lidar, and/or another scanning remote sensing instrument providing like data coverage.

In an embodiment, the system further comprises transforming the ABL wind field information from a native coordinate system to another coordinate system.

In an embodiment of the system, defining portions of the measurement domain within the at least two wind volumes for analysis further comprises: defining an advection analysis area in each of the at least two wind volumes, defining the isolated wind field in the first of the at least two wind volumes, and defining an initial location of the isolated wind field within the advection analysis area of the first of the at least two wind volumes.

In an embodiment, determining advection of the isolated wind field between the at least two wind volumes further comprises: determining a mean horizontal wind speed and wind direction of the first wind volume across the advection analysis area, determining a time elapsed between the first and latter of the at least two wind volumes, defining a domain of feasible advection solutions in the latter of the at least two wind volumes, performing cross-correlation between the isolated wind field in the first wind volume and a domain of feasible advection solutions in the latter of the at least two wind volumes, using a displacement vector exhibiting a highest correlation coefficient to identify a most likely location of the isolated wind field in the latter of the at least two wind volumes, and defining an advection speed and direction according to the displacement vector and the time elapsed between the first wind volume and latter of the at least two wind volumes.

In another embodiment a method for determining ABL wind field advection speed and direction comprises collecting at least two wind volumes from the ABL wind field, transforming the ABL wind field measurements from a native coordinate system to another coordinate system, defining an advection analysis area in each of the at least two wind volumes, defining the isolated wind field in the first of the at least two wind volumes, defining an initial location of the isolated wind field within the advection analysis area of the first of the at least two wind volumes, and determining advection of the isolated wind field between the at least two wind volumes.

In an embodiment of the method, determining advection of the isolated wind field between the at least two wind volumes further comprises: determining a mean horizontal wind speed and wind direction of the first wind volume across the advection analysis area, determining a time elapsed between the first and latter of the at least two wind volumes, defining a domain of feasible advection solutions in a latter of the at least two wind volumes, performing cross-correlation between the isolated wind field in the first wind volume and a domain of feasible advection solutions in the latter of the at least two wind volumes, using a displacement vector exhibiting a highest correlation coefficient to identify a most likely location of the isolated wind field in the latter of the at least two wind volumes, defining an advection speed and direction according to the displacement vector and the time elapsed between the first wind volume and latter of the at least two wind volumes, iterating for at least one of a plurality the process of: correcting for intra-volume advection, OA, and determining the inter-volume advective properties comprising speed and direction, wherein upon convergence of the measured advection profile, the advective properties of the ABL wind field have been appropriately derived.

In an embodiment of the method, the at least two ABL wind measurements are collected across at least two time periods. In an embodiment the at least two wind volumes are measured using at least one of: a scanning radar, a scanning lidar, or another scanning remote sensing instrument providing like data coverage.

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A method for determining wind field advection speed and direction comprising:
    disposing a first radar unit and a second radar unit in proximity to at least one wind turbine;
    collecting at least two wind volumes from an atmospheric boundary layer (ABL) wind field with the first radar unit and the second radar unit in proximity to the at least one wind turbine;
    defining portions of a measurement domain within said at least two wind volumes for analysis;
    using plan-position indicator scanning to direct the first radar unit and the second radar unit to scan along a fixed elevation angle while varying the azimuth of an antenna in order to document a horizontal structure of a flow of said at least two wind volumes;
    determining advection of an isolated wind field between said at least two wind volumes;
    iterating a process of correcting for intra-volume advection, objective analysis, and determining the inter-volume advective properties; wherein upon convergence of a measured advection profile, the advective properties of the ABL wind field are derived; and
    characterizing a wake of said at least one wind turbine according to the advection properties of the ABL wind field.

2. The method of claim 1 wherein said at least two wind volumes further comprise ABL wind measurements collected across at least two time periods.

3. The method of claim 2 wherein each of said first radar unit and said second radar unit comprise at least one of:
    a scanning radar;
    a scanning lidar; and
    a scanning remote sensing instrument providing like data coverage.

4. The method of claim 1 further comprising:
    transforming said ABL wind field measurements from a native coordinate system to another coordinate system.

5. The method of claim 1 wherein defining portions of the measurement domain within said at least two wind volumes for analysis further comprises:
    defining an advection analysis area in each of said at least two wind volumes;
    defining said isolated wind field in the first of said at least two wind volumes; and
    defining an initial location of said isolated wind field within the advection analysis area of the first of said at least two wind volumes.

6. The method of claim 5 wherein determining advection of said isolated wind field between said at least two wind volumes further comprises:
    determining a mean horizontal wind speed and wind direction of said first wind volume across said advection analysis area;
    determining a time elapsed between the first and latter of said at least two wind volumes; and
    defining a domain of feasible advection solutions in a latter of said at least two wind volumes.

7. The method of claim 6 further comprising:
    performing cross-correlation between said isolated wind field in said first wind volume and a domain of feasible advection solutions in the latter of said at least two wind volumes.

8. The method of claim 7 further comprising:
    using a displacement vector exhibiting a highest correlation coefficient to identify a most likely location of said isolated wind field in the latter of said at least two wind volumes.

9. The method of claim 8 further comprising:
    defining an advection speed and direction according to said displacement vector and said time elapsed between said first wind volume and latter of said at least two wind volumes.

10. A system for determining atmospheric boundary layer (ABL) wind field advection speed and direction comprising:
    at least one sensor;

a first radar unit;
a second radar unit;
at least one wind turbine in proximity to the first radar unit and the second radar unit;
at least one processor; and
a storage device communicatively coupled to said at least one processor, said storage device storing instructions which, when executed by said at least one processor, cause said at least one processor to perform operations comprising:
  collecting at least two wind volumes from the ABL wind field with the first radar unit and the second radar unit in proximity to the at least one wind turbine;
  defining portions of the measurement domain within said at least two wind volumes for analysis;
  determining the advection of an isolated wind field between said at least two wind volumes;
  iterating a process of correcting for intra-volume advection, objective analysis, and determining the inter-volume advective properties; wherein upon convergence of the measured advection profile, the advective properties of the ABL wind field have been appropriately derived;
  using plan-position indicator scanning to direct the first radar unit and the second radar unit to scan along a fixed elevation angle while varying the azimuth of an antenna in order to document a horizontal structure of a flow said at least two wind volumes; and
  characterizing a wake of said at least one wind turbine according to the advection properties of the ABL wind field.

11. The system of claim 10 wherein each of said first radar unit and said second radar unit comprise at least one of:
  a scanning radar;
  a scanning lidar; and
  a scanning remote sensing instrument providing like data coverage.

12. The system of claim 10 wherein said at least two wind volumes further comprise ABL wind measurements collected across at least two times.

13. The system of claim 12 wherein each of said first radar unit and said second radar unit comprise at least one of:
  a scanning radar;
  a scanning lidar; and
  a scanning remote sensing instrument providing like data coverage.

14. The system of claim 10 wherein defining portions of the measurement domain within said at least two wind volumes for analysis further comprises:
  defining an advection analysis area in each of said at least two wind volumes;
  defining said isolated wind field in the first of said at least two wind volumes; and
  defining an initial location of said isolated wind field within the advection analysis area of the first of said at least two wind volumes.

15. The system of claim 14 wherein determining advection of said isolated wind field between said at least two wind volumes further comprises:
  determining a mean horizontal wind speed and wind direction of the first wind volume across said advection analysis area;
  determining a time elapsed between the first and latter of said at least two wind volumes;
  defining a domain of feasible advection solutions in the latter of said at least two wind volumes;
  performing cross-correlation between said isolated wind field in said first wind volume and a domain of feasible advection solutions in the latter of said at least two wind volumes;
  using a displacement vector exhibiting a highest correlation coefficient to identify a most likely location of said isolated wind field in the latter of said at least two wind volumes; and
  defining an advection speed and direction according to said displacement vector and said time elapsed between said first wind volume and latter of said at least two wind volumes.

16. A method for determining atmospheric boundary layer (ABL) wind field advection speed and direction comprising:
  collecting at least two wind volumes from the ABL wind field proximate to at least one wind turbine;
  transforming said ABL wind field measurements from a native coordinate system to another coordinate system;
  defining an advection analysis area in each of said at least two wind volumes;
  defining said isolated wind field in the first of said at least two wind volumes;
  defining an initial location of said isolated wind field within the advection analysis area of the first of said at least two wind volumes;
  determining advection of said isolated wind field between said at least two wind volumes;
  directing a first radar unit and a second radar unit to scan along a fixed elevation angle while varying the azimuth of an antenna using plan-position indicator scanning in order to document a horizontal structure of a flow of said at least two wind volumes; and
  characterizing a wake of said at least one wind turbine according to the advection of the isolated wind field.

17. The method of claim 16 wherein determining advection of said isolated wind field between said at least two wind volumes further comprises:
  determining a mean horizontal wind speed and wind direction of said first wind volume across said advection analysis area;
  determining a time elapsed between the first and latter of said at least two wind volumes;
  defining a domain of feasible advection solutions in a latter of said at least two wind volumes;
  performing cross-correlation between said isolated wind field in said first wind volume and a domain of feasible advection solutions in the latter of said at least two wind volumes;
  using a displacement vector exhibiting a highest correlation coefficient to identify a most likely location of said isolated wind field in the latter of said at least two wind volumes;
  defining an advection speed and direction according to said displacement vector and said time elapsed between said first wind volume and latter of said at least two wind volumes;
  iterating for at least one of a plurality the process of: correcting for intra-volume advection, OA, and determining the inter-volume advective properties; wherein upon convergence of the measured advection profile, the advective properties of the ABL wind field have been appropriately derived.

18. The method of claim 16 wherein said at least two ABL wind measurements are collected across at least two time periods.

19. The method of claim 18 wherein said at least two wind volumes are measured using at least one of:

a scanning radar;
a scanning lidar; and
a scanning remote sensing instrument providing like data coverage.

* * * * *